US010326295B2

(12) United States Patent
Zuerner

(10) Patent No.: US 10,326,295 B2
(45) Date of Patent: Jun. 18, 2019

(54) METHOD AND SYSTEM FOR PROVIDING POWER MANAGEMENT FOR A WEARABLE SMART DEVICE

(71) Applicant: Verizon Patent and Licensing Inc., Arlington, VA (US)

(72) Inventor: Helmut Zuerner, Dortmund (DE)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 408 days.

(21) Appl. No.: 14/473,491

(22) Filed: Aug. 29, 2014

(65) Prior Publication Data

US 2016/0064955 A1  Mar. 3, 2016

(51) Int. Cl.
| | | |
|---|---|---|
| *G06Q 40/00* | (2012.01) | |
| *H02J 7/00* | (2006.01) | |
| *G06Q 20/14* | (2012.01) | |
| *G06Q 50/06* | (2012.01) | |
| *G07F 15/00* | (2006.01) | |
| *G07F 15/12* | (2006.01) | |
| *H02J 13/00* | (2006.01) | |

(52) U.S. Cl.
CPC ............ *H02J 7/007* (2013.01); *G06Q 20/145* (2013.01); *G06Q 50/06* (2013.01); *G07F 15/006* (2013.01); *G07F 15/12* (2013.01); *H02J 7/0047* (2013.01); *H02J 13/0003* (2013.01); *H02J 2007/005* (2013.01)

(58) Field of Classification Search
USPC ......................................................... 705/39
See application file for complete search history.

(56) References Cited

U.S. PATENT DOCUMENTS

| 7,805,263 | B2* | 9/2010 | MacK | .................. A61N 1/3708 |
| | | | | 702/63 |
| 9,240,824 | B2* | 1/2016 | Hillan | ...................... H04B 5/00 |
| 2011/0213217 | A1* | 9/2011 | McKenna | .......... A61B 5/14552 |
| | | | | 600/301 |
| 2012/0187684 | A1* | 7/2012 | Kawas | .................... F03D 7/026 |
| | | | | 290/44 |

(Continued)

OTHER PUBLICATIONS

Kimura, Masaru;Charge control system; May 1, 2014; Document URL:https://search.proquest.com/docview/1520983942?accountid=1475 (Year: 2014).*

(Continued)

*Primary Examiner* — Hani M Kazimi
*Assistant Examiner* — Hatem M Ali

(57) ABSTRACT

An approach for managing the use and distribution of power for wearable smart device is described. A wearable platform receives a notification signal for specifying sensor information associated with a sensor of a wearable smart device of a user. The wearable platform also determines a power requirement of the sensor based on the sensor information, contextual information associated with a mobile device of the user, or a combination thereof based on receipt of the signal. Still further, the wearable platform generates a request to regulate a consumption of power by the sensor or other sensors of the wearable smart device, to access a power controller for charging the sensor, or a combination thereof based on the determination, status information associated with the power controller, or a combination thereof.

20 Claims, 15 Drawing Sheets

(56) References Cited

U.S. PATENT DOCUMENTS

| | | | |
|---|---|---|---|
| 2013/0096466 A1* | 4/2013 | Sarrafzadeh | A61B 5/1038 600/592 |
| 2014/0275874 A1* | 9/2014 | Haisley | H02J 7/0042 600/323 |
| 2016/0016626 A1* | 1/2016 | Thompson | B62M 6/45 701/22 |
| 2018/0272874 A1* | 9/2018 | McCool | B60L 11/182 |

OTHER PUBLICATIONS

Jon Gabay; Charge and Battery Control Sensors and Solutions; Contributed by Electronic Products; URL: https://www.digikey.com/en/articles/techzone/2016/may/charge-and-battery-control-sensors-and-solutions (Year: 2016).*

RWP da Silva; Contactless battery charger controller for wireless sensor node;2016; URL: https://ieeexplore.ieee.org/document/7598219 (Year: 2016).*

* cited by examiner

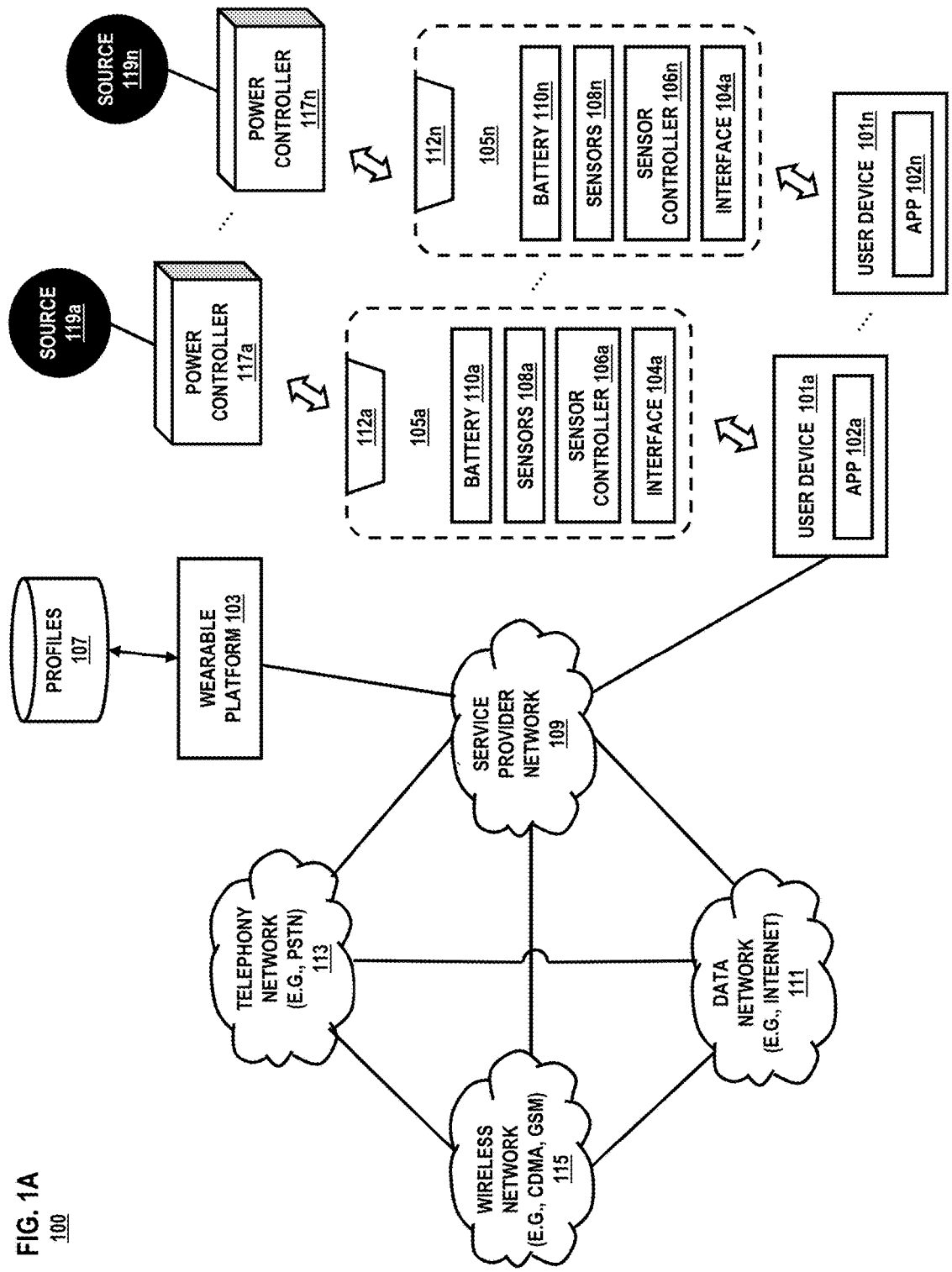

FIG. 1B
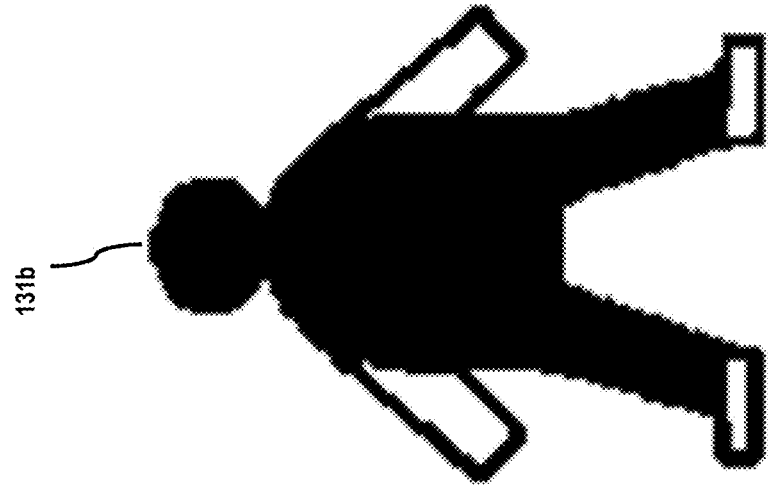
DIGITAL CODE: HS1S2BL1L2F1F2
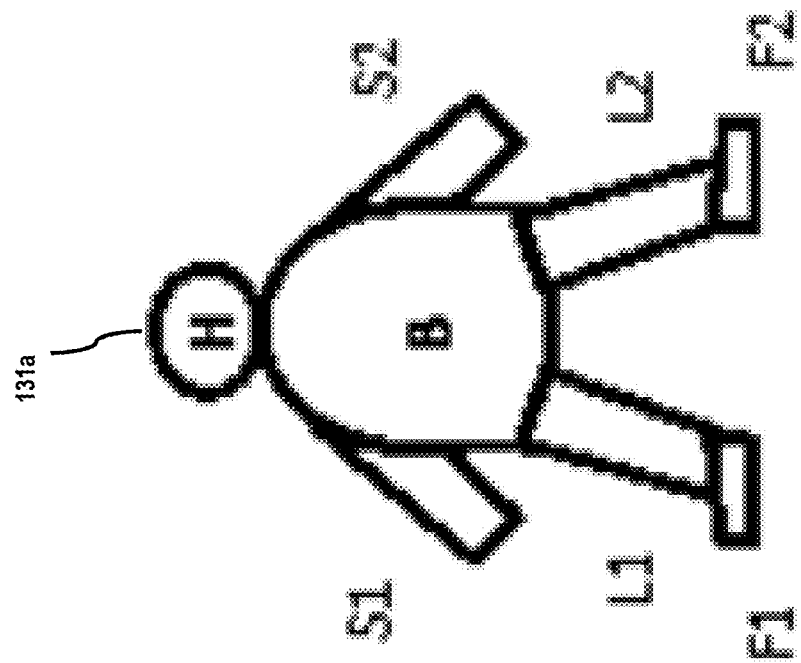
DIGITAL CODE: S1S2F1F2

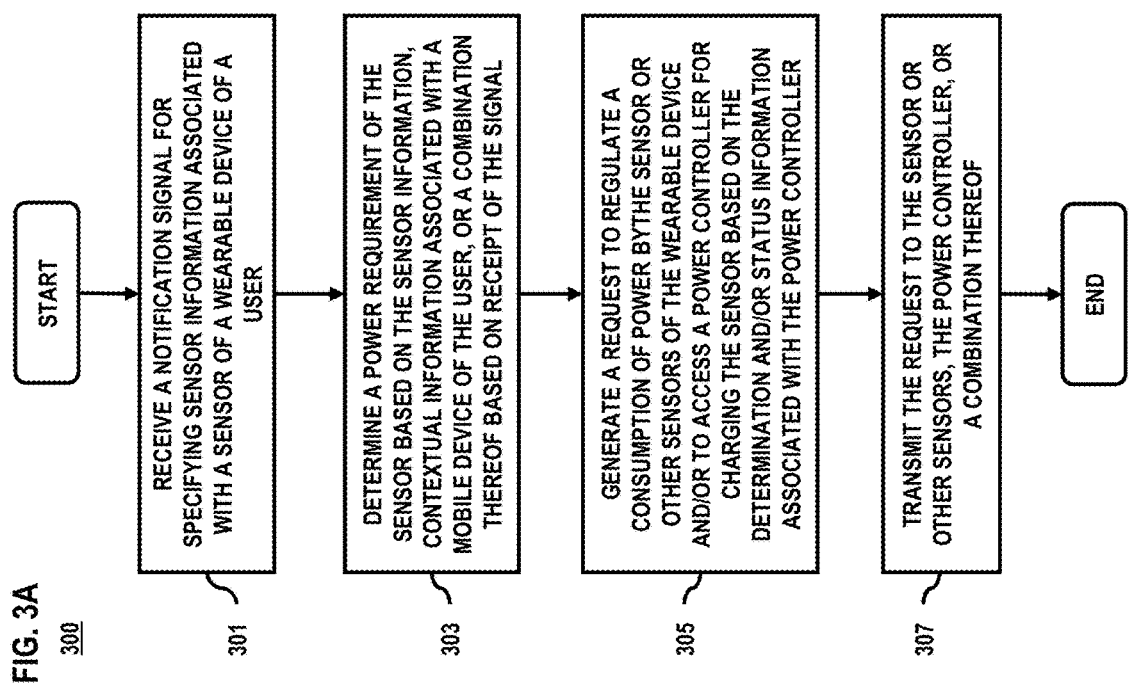

FIG. 3A
300

301 RECEIVE A NOTIFICATION SIGNAL FOR SPECIFYING SENSOR INFORMATION ASSOCIATED WITH A SENSOR OF A WEARABLE DEVICE OF A USER

303 DETERMINE A POWER REQUIREMENT OF THE SENSOR BASED ON THE SENSOR INFORMATION, CONTEXTUAL INFORMATION ASSOCIATED WITH A MOBILE DEVICE OF THE USER, OR A COMBINATION THEREOF BASED ON RECEIPT OF THE SIGNAL

305 GENERATE A REQUEST TO REGULATE A CONSUMPTION OF POWER BY THE SENSOR OR OTHER SENSORS OF THE WEARABLE DEVICE AND/OR TO ACCESS A POWER CONTROLLER FOR CHARGING THE SENSOR BASED ON THE DETERMINATION AND/OR STATUS INFORMATION ASSOCIATED WITH THE POWER CONTROLLER

307 TRANSMIT THE REQUEST TO THE SENSOR OR OTHER SENSORS, THE POWER CONTROLLER, OR A COMBINATION THEREOF

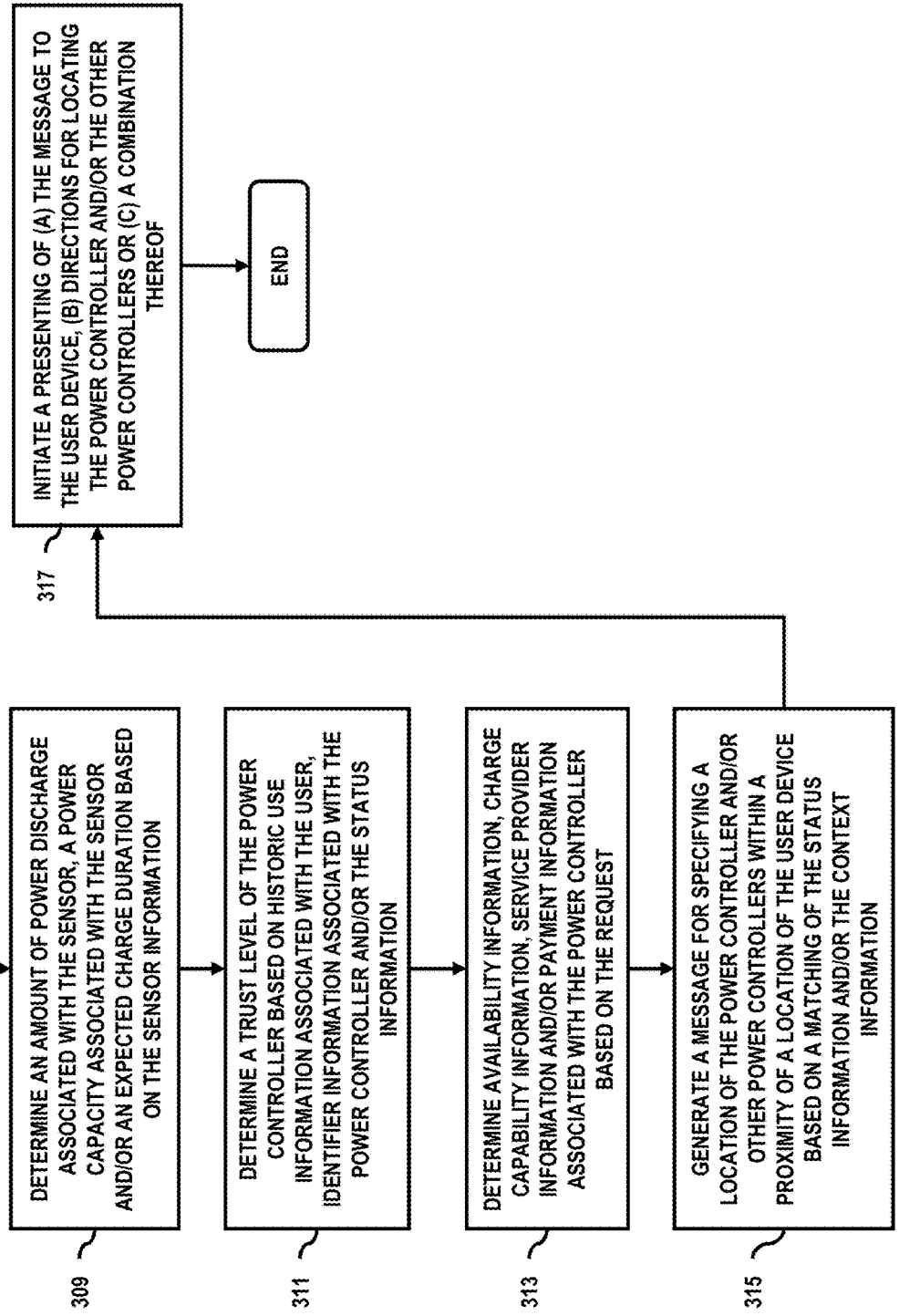

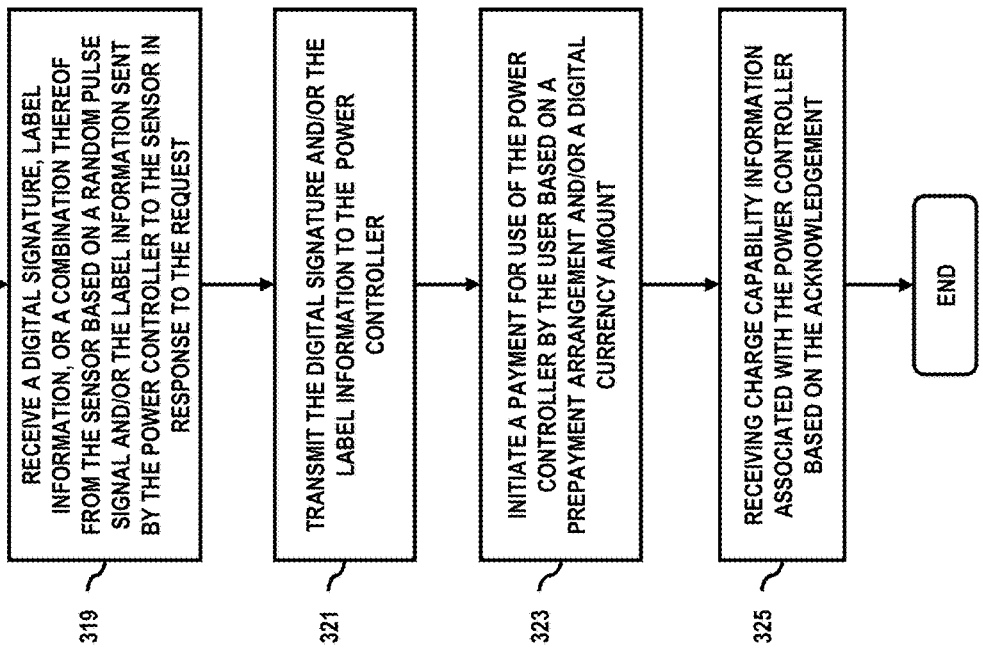

312

METHOD AND SYSTEM FOR PROVIDING POWER MANAGEMENT FOR A WEARABLE SMART DEVICE

BACKGROUND INFORMATION

Service providers are continually challenged to deliver value and convenience to consumers by providing compelling network services and advancing the underlying technologies. One area of interest has been providing users of wearable smart devices with convenient access to power charging sources. Wearable smart devices include any items that can be worn or that make contact with a user for enabling the performance of intelligent functions. Typically, these devices feature multiple sensors for gathering and sharing information regarding user activity, environmental conditions, etc. Consequently, all of these sensors require active rechargeable battery power to be maintained in order for them to perform their sensing functions. In addition, as no two wearable smart devices are necessarily alike, they may have different connector types, charge requirements and other factors that limit their ubiquity. Unfortunately, as the types of wearable smart devices vary widely in form, use and function, traditional methods of managing the available power and charging these devices must be equally diverse and adaptable to the needs of different users.

Based on the foregoing, there is a need for managing the use and distribution of power for wearable smart devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 1A and 1B are diagrams of a system for managing the use and distribution of power for wearable smart devices, according to one embodiment;

FIGS. 3A-3D are flowcharts of a process for managing the use and distribution of power for wearable smart devices, according to various embodiments;

DESCRIPTION OF THE PREFERRED EMBODIMENT

Figure 2:
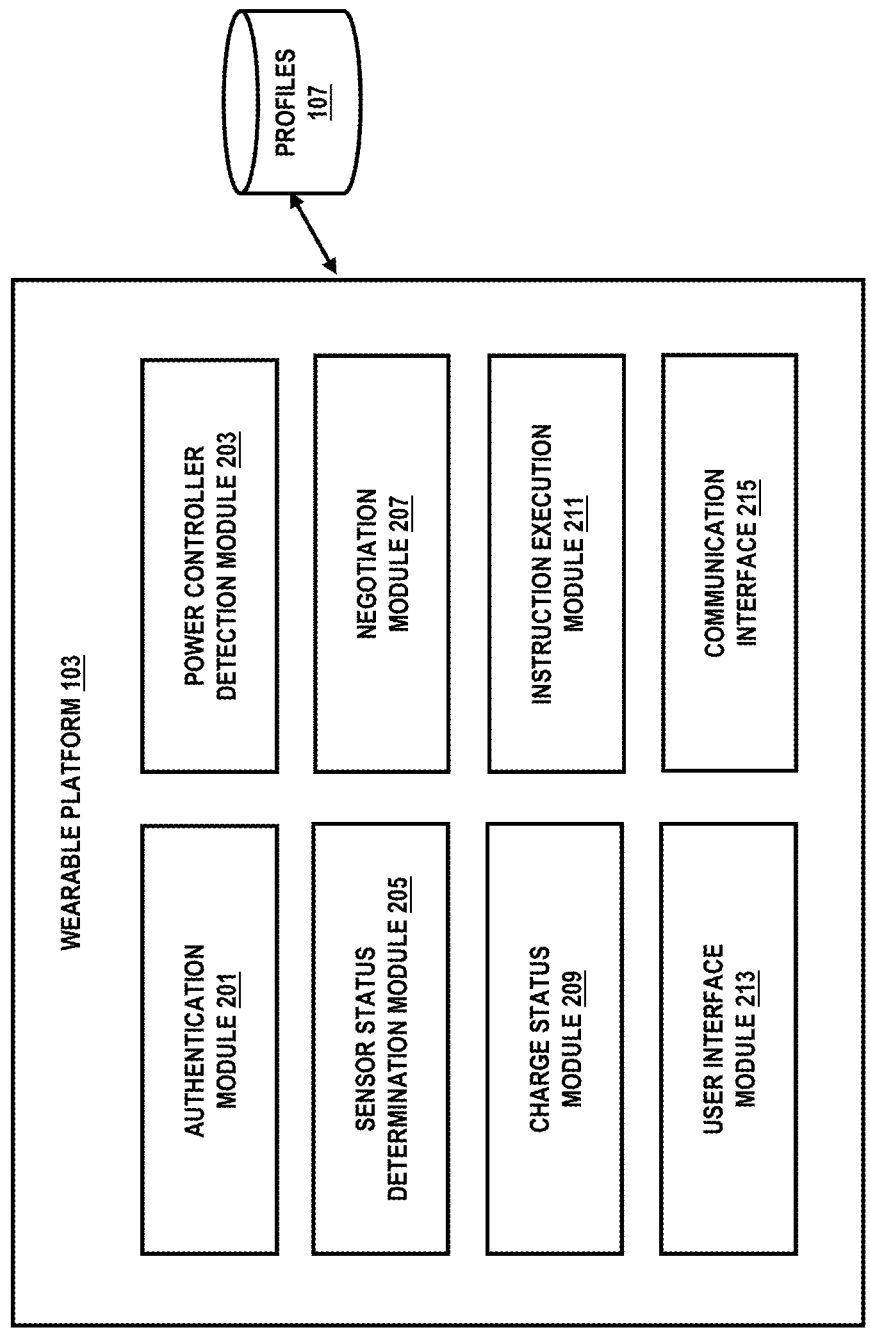
FIG. 2 is a diagram of a wearable platform, according to one embodiment.

An apparatus, method and software for managing the use and distribution of power for wearable smart devices are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to communication between devices via known short range communication protocols, it is contemplated that these embodiments have applicability to any data protocols, methodologies or systems for enabling the exchange of data and/or interconnectivity of user devices.

FIGS. 1A and 1B are diagrams of a system for managing the use and distribution of power for wearable smart devices, according to one embodiment. For the purposes of explanation, system 100 is shown to include one or more user devices 101a-101n (e.g., mobile devices, smart phones, netbooks, laptops, set-top boxes, or any communications enabled computing device), which are configured to communicate with each other, access various services or perform other data and/or network based functions by way of a communication network (e.g., service provider network 109). This includes interfacing with a wearable platform 103, which supports the execution of various management and operational functions for facilitating optimal use of, access to, and control of different wearable smart devices 105a-105n. In addition, the wearable platform 103 supports execution of functions for enabling seamless interaction between wearable smart devices 105 of different configurations/software requirements and power controllers that provide access to power.

For the purpose of illustration herein, the system 100 may be employed within the context of an Internet of Things (IoT) environment. IoT may refer to any model, paradigm, schema or device interaction protocols for supporting the interconnection of uniquely identifiable devices over the existing Internet infrastructure. This may include, for example, personal computing devices or any devices having embedded sensors within that are capable of communicating over a network (e.g., service provider network 109) via a variety of protocols, domains and applications. This may also include wearable smart devices, i.e., items that can be worn or that make physical contact with a user for directly performing or supporting the execution of various intelligent functions. As noted previously, there are numerous wearable smart devices in the form of eyeglasses, jackets, rings, shoes, watches and other personal items. In addition, various instruments or tools such as seats, beds, tables or the like may also be considered "wearable," which means they have one or more built-in electronic components for executing different functions. In the simplest case, the wearable smart device 105 may include one or more sensors 108a-108n, referred to herein collectively as sensors 108, for collecting control data, usage data or other information regarding the user, the user's environment, contextual information, or the like.

By way of example, a "smart" shoe may feature various contact sensors that are placed inside the sole for collecting movement or speed data regarding a runner. In and of themselves, the sensors 108 may not provide any additional intelligence other than collecting data. However, these sensors 108 may be configured to transmit the data they collect, as a result of contact or interaction with the user (wearer of the device) or the environment thereof, in real-time or periodically to an application 102 of a user device 101. The application then processes the collected data to enable execution of various intelligent actions. In the above described case of the runner, for example, this may include route planning, workout planning, exercise tracking, or various forms of predictive modeling or user recommendation generation; all of which are only possible because of the data. In addition, the feedback information may also be sent from the application 102 to the sensors 108. Still further, the sensor information may be exchanged with different online resources via a network (e.g., service provider network 109), or via a short-range wireless protocol.

Other more advanced wearable smart devices 105 may also feature controllers or actuators for executing various intelligent actions. For example, in the case of the runner, an instruction may be transmitted to a flexibility controller within the shoe to change the elasticity of the sole from walking (soft) to running (hard) based on collected running or speed data or current internal temperature or pressure level data of the runner's feet. In addition, some wearable smart device circuitry configurations may feature basic sensor controllers 106a-106n, referred to herein collectively as sensor controllers 106, that regulate the distribution of power of the limited batteries 110a-110n (referred to herein collectively as batteries 110) among the different sensors 108. The sensor controller 106, therefore, can switch the power ON/OFF or increase or decrease voltage levels of respective sensors 108. Depending on the configuration of the wearable smart device circuitry, the sensor controller 106 may access the internal battery 110 of the wearable smart device 105 on behalf of the sensors 108 or the sensors 108 may each have an individual battery 110 that is regulated by the sensor controller 106.

Also, the sensor controller 106 or sensors 108 may interact with an interface 104 for supporting wireless connectivity of the wearable smart device 105. The interface 104a-104n, referred to herein collectively as interface 104, may broadcast and/or transmit collected sensor information to a calling (wearable smart) application 102. In addition, the interface 104 permits the receipt of wireless instructions from the application 102 or other wearable smart devices 105. As such, wearable smart devices 105 are a key component of the Internet of Things (IoT) connectivity model/paradigm, wherein the exchange of data between devices enables increased levels of real-time intelligence and monitoring, device automation, application support, etc. Due to the ubiquitous nature of connected objects in an IoT environment, an unprecedented number of devices are expected to be connected to the Internet in the near future.

The wearable smart device 105 may also interact with different power controllers 117a-117n, referred to herein collectively as power controllers 117. The power controllers 117 may be employed as charging stations for providing a battery of the wearable smart devices with access to power sources 119a-119n, referred to herein as power sources 119. In certain instances, the power controllers 117 are placed at different locations throughout a geographic region. As such, they may be offered by different service providers and may include different features, payment options and charge capabilities. For example, some power controllers 117 feature wired connectors (e.g., a cable with a specific connector type) that plug into an input connector or port of the wearable smart device 105 for enabling a battery charge. Other power controllers 117 may feature charge contact connectors for making direct contact with a complimentary contact (e.g., another connector) of the wearable smart device 105 for transferring power to the battery. By way of example, the connectors (e.g., connectors 112a-112n) may be implemented in the form of conductive strips, metal pins or terminals, conductive mesh, or the like for enabling the transfer of power. Typically, the style of the sensor and/or contact type varies depending on the manufacture of the wearable smart device 105, the intended function of the wearable smart device 105, design factors, capacitance requirements, etc. Thus, not every power controller 117 is amenable to, or able to, connect with a given wearable smart device 105.

Numerous factors must be considered in managing the use of the limited battery 110 power of wearable smart devices 105, as a constant power feed is impractical given the mobile/wearable nature of these devices 105. Also, because of the constrained nature of the tiny sensors 108 used in wearable smart devices 105, most of the intelligence to manage power (e.g., turn power ON/OFF, balance available power between sensors, check charging status, check power requirements) cannot sit within the wearable smart device nor is it practical to transport an external battery or house a bulky battery inside the wearable smart device 105 (e.g., "bulky" relative to the specific item described). Thus, given the wide variation of design configurations, form factors, usage contexts and environments in which wearable smart devices 105 they may be employed, there is a need to effectively supply power to them in a manner that accommodates different interface 104 types, sensor 108 types and power regulation needs. Furthermore, there is a need for enhancing a user's ability to regulate and manage their devices across circuitry configurations, form factors and usage types.

To address this issue, system 100 presents a wearable platform 103 that is configured to operate in connection with a user device 101 for managing the power needs of wearable smart devices 105. By way of example, the wearable platform 103 enables execution of various power management functions for supporting different wearable smart device types, sensor 108 arrangements and/or configurations (e.g., with or without a sensor controller 106) thereof. Also, the wearable platform 103 may support interaction with different types (variants) of external power controllers 117 of a power source 119 for executing the different power management functions. For the purpose of illustration herein, system 100 may be employed as a ubiquitous power management and distribution mechanism for overcoming the aforementioned constraints and limitations of current power management approaches of wearable smart devices 105. It is further contemplated that the principles, schemes and mechanisms of system 100 may be distributed throughout and/or utilized within an IoT environment for enabling smart wearable devices 105 to be charged as easily and seamlessly as easily as it is for users to access the Internet.

In one embodiment, the wearable platform 103 may interact with a wearable smart application 102 of the wearable smart device 105. The wearable smart application 102 may be customized to the specific needs and functions of the wearable smart device 105 and may feature one or more application programming interfaces for executing functions of the wearable platform 103, communicating with the wearable platform 103 via a network (e.g., 109) or the like. It is noted that the application 102 may execute function calls locally at a user device based on signals, instructions, requests generated by the wearable platform 103 at a service or platform level. Hence, the exemplary embodiments herein contemplate any means of implementation of the wearable platform 103, including implementation as a direct executable of the user device 101 (as or in conjunction with the application 102), as a hosted or cloud based service, or a combination thereof.

In addition, the application 102 may be configured to operate in connection with one or more sensors (not shown) of the user device 101 for supporting any known range based communication techniques, such as ZigBee, Bluetooth, Wi-Fi, near field communication (NFC), or the like. It is noted, therefore, that the application 102 may wirelessly communicate with the sensors of the wearable smart device 105 (or in some cases the sensor controller 106) for receiving sensor information or for transmitting instructions. As such, the wearable platform 103 may also receive the sensor information or transmit instructions in conjunction with or on behalf of the application 102 accordingly.

In one embodiment, the wearable platform 103 receives sensor information from various sensors 108 periodically or in real-time (depending on the function of the sensors 108). For the purpose of illustration herein, the sensors 108 may also refer to the sensor controller 106 unless expressly stated, given that in certain instances the sensor controller may also communicate with the wearable platform 103 via the application 102. By way of example, the sensor information may include sensor identification information, energy label information (e.g., power demand/charge capacity), battery status information (0-100%), timer settings or duration information (e.g., ON or OFF times, duration of activity or nonuse). In addition, the sensor information may also include power signature information, which is generated by the sensors per a wearable smart device-to-power controller negotiation and identification scheme. More regarding this functionality will be discussed later on herein.

In one embodiment, the wearable platform 103 processes the sensor information to perform various functions, including for example specifying one or more actions to be performed directly by the sensors. This may include, for example, turning some sensors 108 ON or OFF as a means of conserving power usage by a sensor determined to have limited battery charge. As another example, the sensors may be turned ON or OFF as a means of balancing the operation of all the sensors of the wearable smart device 105, such as based on the sensor information for all sensors 108 of the wearable smart device 105, a specific task being performed by the user with respect to the wearable smart device 105, etc. As another example, the instructions may include configuring a timing of execution of sensors 108 for performing just-in-time (JIT) execution as another means of conserving battery 110 power.

Still further, the wearable platform 103 may also enable generation of various functions for interacting with a power controller 117, including initiating the presentment of instructions for a user to activate or deactivate a mechanical-electrical power controller, identifying a wearable smart device 105 as compatible for use with an intelligent power controller, engaging in a negotiation procedure for enabling access to an intelligent power controller, determining a level of reliability or trust of the power controller 117 with respect to the user, initiating various procedures for analyzing a level of connectivity between a sensor and a power controller 117, invoking signal systems of the user device based on the level of connectivity, etc. Hence, the instruction rendered by the platform 103 to be performed by the sensors 108, the sensor controller 106, the power controller 117, the user device 101 (e.g., via the application 102) or the user (e.g., as a recommended instruction/action to be performed). Thus, the instructions rendered by the platform 103 may vary depending on the type and/or capabilities of the external power controller 117 available to the user for charging the wearable smart device 105.

In one embodiment, the wearable platform 103 may interact with external power controllers 117 of different configurations and functionality, as described in TABLE 1 below. Of note, a charge/power connection may be established between the wearable smart device 105 and the power controller 117a by way of a wired connection (e.g., a physical cable for insertion to a female connector or port (e.g., connector 112) of the wearable smart device 105). Alternatively, the charge connection may be established based on direct contact means between the sensors 108 and various contact charge points of the power controller 117.

TABLE 1

Constant Power (No Power Control)

This is the simplest power controller 117 configuration. In this case, the power controller 117 is a terminal with constant power feed only. Thus, there is no actual power regulation or computational intelligence required. Wearable smart devices 105 are charged only for the time they are connected. Per this implementation, there is no power control between the wearable smart device 105 and the source 119.

Mechanical-Electrical Power Controller

In this configuration, the power controller 117 is a mechanical-electrical controller. Per this approach, a mechanical switch is provided to the user that features buttons for switching battery power for a given sensor of the wearable smart device 105 ON or OFF. This type of power controller 117 does not contain computational intelligence, but rather, operates as a user-driven sensor controller for affecting battery use of the wearable smart device 105.
By way of example, the wearable platform 103 operates in connection with the application 102 to provide instructions (wirelessly) to the user device 101 for indicating when the user should manually switch power (e.g., a battery) to a given sensor (ON or OFF). Under this scenario, the instruction may be rendered to the user device 101 of the user as a recommendation. Hence, the sensor information may be analyzed by the application/platform to determine which sensors should be turned ON or OFF based on the available power, the level of charge of other sensors, an expected duration of need of the sensor, etc.

Intelligent Power Controller

The intelligent power controller 117 will be a computing device with a network interface for interacting with the user device 101. In addition, the power controller 117 may feature its own application 102 for enabling user device 101 interaction with the controller. Per this implementation, only user devices 101 configured with the application 102 may execute the various functions of the power controller 117. There is no communication between the power controller 117 and the wearable device 105, thus requiring no required battery use of the wearable device 105 or sensors 108 thereof. By way of example, the power controller 117 may execute one or more of the following tasks (functions) below:
   1. Broadcasting its capabilities as a power controller (e.g., a power charging station) over a local network (e.g., similar to Wi-Fi)
   2. Participating in an authorization process with applications 102 wanting to charge wearable smart devices 105

TABLE 1-continued

3. Specifying and signaling a digital profile about its charging capabilities (e.g., specific charge contact points)
4. Identifying with the application 102 of the user device 101 that the wearable smart device 105 is properly connected and charged (e.g., detect polarity (+/−), reverse polarity, pressure level)
5. Allocating power to charge the connected wearable smart device 105 upon authorization
6. Powering sensors 108 ON or OFF (as instructed per the application 102/platform 103)
7. Coordinating payment options, invoicing, etc., with the managing application 102
8. Providing usage information/data to the application 102:
    a. The amount of power of the power source 119
    b. A current load
9. Obtaining information about the location of wearable smart devices 105, in order to manage complex power management and allocation scenarios of geographically distributed devices.

For the purpose of illustration, an exemplary use case regarding exemplary function number 9 of as presented in TABLE 1 is now presented. Per this use case, a central application is employed on the user devices 101 of police officers for managing all smart police jackets in a city. Still further, per this scenario, the police department may be under contract with an electricity provider to access power controllers 117 for charging the jackets at selected locations in the city. Based on the sensor information provided by the user devices 101, the wearable platform 103 is able to maintain details regarding the status of the batteries for powering the jackets, the number of jackets in service versus the number of spare jackets, the position/location of jacket users, upcoming events such as shifts changes, etc. Also, by sharing the available data with an application managing the power controllers 117 based on the exclusive contract, the electricity provider may optimize electricity allocation and distribution for charging of the jackets in order to achieve optimal service as well as the most attractive pricing for the police department.

It is noted that the wearable platform 103 may interact with any of the above described types of power controllers 117. Furthermore, as noted per the exemplary use case described above, the platform 103 may aggregate the sensor information for use in running various reports. This includes the generation of reports for performing analysis, planning, usage modeling, etc. This reporting may be performed independent of the operation of the sensors. Also, by performing the reporting subsequent to the gathering of sensor information, the sensors need not be kept ON persistently for draining the battery power.

In one embodiment, the wearable platform 103 may also identify a trust level associated with a power controller 117. The trust level may specify whether the power source 119 and/or the power controller 117 is familiar to the user of the wearable smart device 105. This corresponds to a 'trusted' or 'untrusted' status, wherein the trusted status corresponds to an established relationship between the user and the power controller 117 while untrusted means no established relationship. By way of example, the trust level may be determined by the platform 103 based on historical information for indicating a prior use of the power controller 114, location information regarding the power controller 117, device identifier information, familiarity of a user with the provider of the power controller 117 or other information. This historical information may be maintained in connection with profile information 107 of the user.

By way of example, in a personal car of the user, the wearable platform 103 may readily locate the power controller 117 or authenticate the application 102 managing the wearable smart device 105 (e.g., a wearable smart ring that interfaces with charge contacts in the steering wheel). The familiarity of the user may be identified based on prior use or location information as maintained via the profile information 107 of the user. Based on this, the power controller 117 of the vehicle is designated trusted, thus enabling the functions of the power controller 117 to be performed. This may include tasks such as allocating and managing input power, powering the wearable smart ring ON or OFF as per instructions from the application 102 (e.g., as per a power management scheme), reporting load or input power or other information requested by the application 102, etc.

In another example, the wearable platform 103 determines an untrusted relationship with a power controller 117 located at an airport based on a lack of prior use or location information associated with the wearable smart device 105/user in relation to the power controller 117. The identification process may include detecting a broadcast signal of the power controller 117, which may include a broadcasting of identification information, service provider identifier information, etc. Under this scenario, power controllers 117 may broadcast their capabilities via a dedicated internet protocol (IP) address or network port. A short range communication protocol, such as Bluetooth, may also be used to enable detection of the power controllers 117 by user devices 101 within range. Once identified, the platform 103 may cross reference the user device identifier or user identifier against stored profile information 107 to determine if a match exists between the broadcasted identifier of the power controller 117. When no match is found, the wearable platform 103 may then initiate an authorization procedure with the power controller 117 in order to establish a trusted relationship and gain access to the power source 119.

In one embodiment, the wearable platform 103 may also perform a feasibility check for determining the feasibility of a wearable smart device 105 to negotiate power options with a given intelligent power controller 117. By way of example, the wearable platform 103 may determine the feasibility of charging the device based on the current battery status of the smart wearable device 105 or information from one or more online resources (e.g., historical usage data, power charging patterns or user mobility patterns). The determination may also be based on current contextual conditions, such as location, user or wearable smart device 105 availability, user or smart wearable device 105 status, etc.

Still further, the feasibility may further be based on pricing information associated with a given power controller 117, i.e., the cost per unit of power. For example, a low feasibility may be determined in the case where the cost per unit of power for a given power controller 117 exceeds an amount of credits/currency available to the user. As another example, the feasibility may be determined to be low in the case where the amount of time required to bring the wearable smart device 105 to a full charge exceeds the available credits/currency of the user. Hence, the wearable platform 103 may decide power charging is uneconomical for the time and/or cost required and recommend that charging be postponed to a different time and/or location. It is noted, in certain instances that smart wearable devices 105 may be connected to a power controller 117 without being charged. Under this scenario, the power controller 117 may signal a message to the wearable platform 103 to remove the connected smart wearable device 105 if not charged in order to better manage its resources when there is high demand.

In one embodiment, the wearable platform 103 negotiates with a power controller 113 in order to gain authorized access to the power source 119. The negotiation procedure may include establishing an operational relationship between the power controller 117 and the wearable smart device 105, determining a charge capability of the power controller 117 and establishing payment options. It is noted, therefore, that the negotiation/authorization procedure pertains to an intelligent controller 117, as described with respect to Table 1.

As part of the negotiation/authorization process, the user device 101 featuring the wearable smart application 102 may transmit (per Bluetooth, Wi-Fi or NFC) relevant sensor information collected from the sensors 108 and transmit this information to the identified power controller 117. The sensor information may include a total load requirement of the wearable smart device 105 (e.g., based on the total charge requirement of the various sensors 108) or an estimated charge duration of the sensors 108. Once received, the power controller 117 then determines its availability to fulfill the request, including validating it can meet the load requirement as well as checking for available open charge contact connectors. The power controller 117 may then transmit a signal back to the user device 101 for acknowledging it can handle the load.

In addition, the acknowledgement may specify a payment requirement to be fulfilled by the user for enabling access to the power source 119. By way of example, the payment may be executed according to a digital credit scheme, wherein a certain number of credits corresponds to a monetary value. The credits may be purchased in advance by the user, i.e., by way of a digital currency vendor website of via the website of the provider of the power controller and/or source 119. In addition, these credits may be recharged via the website and managed by the wearable smart application 102 in connection with the wearable platform 103. It is further contemplated that the credits may be automatically recharged or purchased on demand in certain instances via the wearable smart application 102 per established permissions of the user. The digital credits are consumed as a function of the amount of power or time required to charge a given wearable smart device 105.

Still further, the power controller 117 may submit information for indicating its charge capabilities. By way of example, the charge capabilities may correspond to a digital code for representing a location point or mapping of the charge contact connectors of the power controller 117 to the complimentary contact connectors of the wearable smart device 105.

FIG. 1B is a diagram depicting an exemplary scheme for generating charge capability information. As noted, the charge capability information may be generated by the power controller 117 as per the power usage authorization/negotiation process with the wearable platform 103 operating in connection with the user device 101. It is contemplated in certain embodiments that the wearable platform 103 may also enable the generation of charge capability information in relation to the wearable smart device 105 that is to be charged via the power controller 117. Under this scenario, the platform 103 may transmit the charge capability information as a requirement to the controller for indicating the respective charge contact points of the wearable smart device 105.

For the purpose of illustration, a graphic model 131*a* of a human body is presented. This model 131 may correspond to a wearable item such as a jacket or pants having charge contacts at various regions of the body. The graphic model 131*a* may differ depending on the capabilities and/or function of the wearable smart device 105 to be charged or the organism in which the wearable smart device 105 is to be used (e.g., a graphical model of a dog may be used for a wearable smart leash). Under this scenario, the graphic model 131*a* is coded as a digital map, thus depicting which parts or regions of the body (and thus the wearable smart device) a respective power controller 117 could make contact with in order to deliver power.

By way of example, charge contacts corresponding to the head are coded H, the arms are coded S1 and S2, the body (torso) is coded B, the legs L1 and L2 and the feet F1 and F2. Thus, the digital code corresponding to all of the charge contact points of the body is represented as HS1S2BL1L2F1F2. In the case where the power controller 117 is only configured with charge contact connectors for the sleeves and shoes, however, the digital code S1S2F1F2 is generated. In addition, the power controller may highlight the areas of the graphic model that it is able to accommodate. For example, the areas in black per graphic model 131*b* represent the segments of the body that are not available while the white highlighted areas correspond to the arms and feet. Based on this, the digital code and/or highlighted graphic model data transmitted by the power controller to the wearable platform 103 as charge capability information.

In one embodiment, the authorization/negotiation process may also include an identification (validation) procedure, wherein the ability of the wearable smart device 105 to be charged and managed by an operating system/management application of the controller is validated. The validation is performed to ensure the correct wearable smart device 105 is interacting with the power controller 117 for charging purposes; given there is no network (wireless) communication between the power controller 117 and the wearable smart device 105. For this reason, there is no loopback (confirmation) signal generated as a result of identification of the power controller 117 by the application 102 and/or the actual physical connection of the wearable smart device 105 to a contact of the power controller 117. Without the validation, there is a risk another wearable smart device not in scope may connect to the power controller 117 for accessing the power source 119.

The validation procedure is also important for supporting charge connectivity in an untrusted environment due to the wide variety of different configurations of wearable smart devices 105. Still further, this procedure may be performed to ensure that billing for access to the power controllers 117 is limited to identified and authorized power controllers 117 (e.g., to prevent fraud and/or spoofing). It is noted that power can only be provided by the power controller 117 when the validation is successful.

To achieve this validation, the power controllers 117 may send a series of randomly generated ON or OFF power pulses to the sensors of the wearable smart device 105 to be charged. The sensor 108 may be configured to operate in connection with a simple AD converter module, which translates the pulse signal into a digital signature—i.e., a sequence of corresponding 1's and 0's (e.g., 10100110). Once generated, this data is then transmitted to the wearable smart application 102/platform 103 along with label information (e.g., for specifying an identifier of the wearable smart device 105). The wearable platform 103 then sends the digital signature and label information to the power controller 117, prompting the controller 117 to compare the pulse pattern it generated to the digital signature. Only when a match is determined does the power controller 117 acknowledge the request to access the power controller 117 by the user for the wearable smart device 105. As such, no charge is allowed to be transmitted by the power controller until the authorization process is confirmed.

It is noted that the authorization/negotiation process may not be required in all cases. For example, power controllers 117 provided at a local park for use by the public as a free service need not engage with the wearable platform 103 in the manner discussed herein. Also, this process may not be performed in the case where the charge service to be performed is limited or the wearable smart device 105 itself features very few sensors. Under this scenario only a best effort charge capability need be performed while other more advanced features are restricted.

Still further, it is noted that the digital signature, digital code, graphical model 131b, availability information and other data generated per interaction between the wearable platform 103 and power controllers 117 may be considered status information—i.e., any data for indicating the capabilities or current capacity of the power controllers 117. It is contemplated, in certain embodiments, that the status information may also be considered in connection with context information regarding a power controller 117, the user device 101 or a user, for enabling advanced management executions to be performed. For example, in the case where a power controller indicates its load is already to full capacity, timestamp information and expected duration information regarding another wearable smart device currently being charged may be used to recommend the user attempt to use the controller in 18 minutes.

In one embodiment, the wearable platform 103 may cause an alert to be rendered to the display of the user device in response to determining a failed or limited charge connection between a wearable smart device 105 and the power controller 117. By way of example, the wearable platform 103 may submit an instruction to the wearable smart application 102 to invoke an optical (e.g., blinking light emitting diode (LED)) or acoustic signal in response to a determining of a limited charge connection between the charge contacts of the wearable smart device 105 and the power controller 117. This may correspond to an instance of improper polarity, reverse polarity, no charge (e.g., dead sensor) or slow charge being detected by the power controller 117 as it interacts with the wearable smart device 105.

The optical or acoustic signal may be rendered to the user device 101 to indicate that the user should adapt the position or orientation of their body or the contact that is interfacing with the controller 117s. By way of this approach, the user is then able to re-establish its connection to the power controller in the case where a full disconnect is detected or they can better align the contacts of the wearable smart device 105 with that of the power controller 117. It is noted that this approach serves as a means of training users for subsequent use of the power controller 117 with respect to their wearable smart device 105. Users may quickly learn about the best contact "position" for charging the wearable smart device 105—i.e., to avoid being interrupted during normal action/activity of the wearable smart device by an acoustical or optical signal. For example, in the case where the wearable smart device 105 is a shoe capable of interacting with a power controller 117 of a vehicle (e.g., trusted), a charge contact of the vehicle may include the accelerator. An acoustic signal may be generated at the user device 101 or the audio system of the vehicle when it is detected that the contacts of the shoe are not properly aligned with or making contact with the accelerator.

It is noted that various messages may be generated at the user device 101 per the application 102 for indicating a charge status of the wearable smart device 105 during the connection. For example, an icon may be presented by the platform 103 for indicating a remaining amount of charge time for the wearable smart device as it is connected, an amount of digital credits (currency) consumed based on the charge period executed thus far, one or more recommendations, etc. In addition, a completion message may be generated for indicating completion of the charge as well as an invoice regarding payment, a transaction receipt, a charge report, etc.

In one embodiment, the wearable platform 103 may perform analysis of the sensor information collected over time from the various sensors, as well as control and interaction/usage information collected from the various power controllers 117. This information may be stored as profile information 107 and subsequently analyzed to observe usage patterns, charge characteristics, and requirements of the wearable smart devices 105 of a user and/or the power controllers 117 they interact with. For example, a typical charge frequency and duration may be determined for specific sensors or the wearable smart device 105 overall. As another example, power parameters from sensors 108 may be analyzed in order to identify sensors that are broken or not working correctly (e.g., battery needs replacement). As yet another example, comparative analysis may be performed, such as comparing the average charge duration as per the collected data sensor information against that value specified by the manufacturer of the wearable smart device 105, comparing the sensor power load as determined per the gathered sensor information against the manufacture specification, etc. Still further, usage statistics may be gathered based on the frequency of power charging, and pricing information for charging the wearable smart device 105. Under this scenario, the statistics may be utilized subsequently by the platform 103 to recommend or automate usage patterns for smart wearable device 105 under certain conditions. For example, the wearable platform 103 may identify conditions where the same usage patterns are occurring and reduce the frequency of recording/reporting, thus enabling power to be saved. As another example, when sensors of the same wearable smart device (e.g., a smart jacket) or of different wearables (e.g., eyeglass and wristwatch) are associated with the platform 103 per the same user (e.g., the same account), the platform 103 may again recall the usage pattern information. It is noted that the deactivating of power for certain sensors may be performed based on a user acknowledgement, as a result of "start-stop" function, etc. Switching the power off for a given sensor may result in power savings to be achieved. It is noted that user devices 101 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the UDs 101a-101n can support any type of interface for supporting the presentment or exchanging of data. In addition, user devices 101 may facilitate various input means for receiving and generating information, including touch screen capability, keyboard and keypad data entry, voice-based input mechanisms and the like. Any known and future implementations of user devices 101 are applicable.

It is also noted that the wearable platform 103 may accommodate any of the above described implementations of the power controller 117. Moreover, it is noted that the functions and executions of the power controllers 117 may vary depending on their intended use, the environment, the types and/or requirements of the wearable smart devices 105 requiring their use, or other factors.

In certain embodiments, user devices 101, the wearable platform 103 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication networks 109-115 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

FIG. 2 is a diagram of a wearable platform, according to one embodiment. The wearable platform 103 includes various executable modules for performing one or more computing, data processing and network based instructions that in combination provide a means for managing the use and distribution of power for wearable smart devices. Such modules can be implemented in hardware, firmware, software, or a combination thereof. By way of example, the wearable platform 103 may include an authentication module 201, a power controller detection module 203, a sensor status determination module 205, a negotiation module 207, a charge status module 209, an instruction execution module 211, a user interface module 213 and a communication interface 215. In addition, the wearable platform 103 may also access profile information 107 for enabling execution of the various module 215.

In one embodiment, an authentication module 201 authenticates users and user devices 101a-101n for interaction with the wearable platform 103 and application 102. By way of example, the authentication module 201 receives a request to subscribe to the wearable smart device service for enabling access to power controllers 117, managing power usage of wearable smart devices 105, etc. This may include establishing user credentials, payment credentials or the like for storage in connection with a profile of the user.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the platform 103 (e.g., as enabled by user interface module 213). Profile information for respective subscribers, which contains pertinent user or device profile data, may be cross referenced as part of the login process. Alternatively, the login process may be performed through automated association of profile settings maintained as registration data 217 with an IP address, a carrier detection signal of a user device, mobile directory number (MDN), subscriber identity module (SIM) (e.g., of a SIM card), radio frequency identifier (RFID) tag or other identifier.

Still further, the authentication module 201 may cross reference the profile information in response to the detection of a power controller (e.g., a broadcast signal) by the power controller detection module 203. This may be performed in order to determine a trust level of the power controller 117. As such, the profile information 107 may be analyzed to identify if any historic use information for the controller exists relative to the identifier of the controller or known status information associated with the power controller, etc. The status information may include, for example, availability information, charge capability information, service provider information, payment information, or a combination thereof of the power controller 117. In addition, the power controller detection module 201 may process contextual information as collected by various sensors of the user device for identifying the locations of power controllers within proximity to the user (e.g., based on location information). While not shown, the power controller detection module 203 may interact with a third party mapping or location service for enabling the location identification process.

In one embodiment, the sensor status determination module 205 determines a power requirement of the sensor based on the receipt of sensor information from the sensors. The information may include a current power level, sensor identifier information, timing information. This information may then be provided to the negotiation module 207, which submits this information to a power controller for enabling a negotiation/authentication of the wearable smart device 105 for access to the power controller 117. By way of example, the negotiation module facilitates the sending of a digital signature to the power controller 117 based on receipt of pulse information from the sensors of the wearable smart device 105 during the access request process. Also, the negotiation module 207 may interact with the power controller 117 via a communication interface 215 to receive digital code and graphical map information regarding the charging capabilities of the controller. Still further, the module 207 validates payment information and service provider information in connection with the authentication module. This may include, for example, verifying that the number of credits required for payment of a charging session with a controller is available in a digital credit account associated with the user.

In one embodiment, the charge status module 209 alerts users of improper connectivity between a charge contact of the wearable smart device 105 and the power controller 117. By way of example, the module 209 may submit an instruction to the wearable smart application 102 to invoke an optical (e.g., blinking LED) or acoustic signal in response to determining a limited charge connection. This may correspond to an instance of improper polarity, reverse polarity, no charge (e.g., dead sensor) or slow charge being detected by the power controller 117 as it interacts with the wearable smart device 105 of low power conditions, improper sensor operation, etc. Also, the charge status module 209 may operate in connection with the communication interface to support the generation of alerts for other systems associated with user, the user device or the wearable smart device 105. For example, in the case where a wearable smart jacket may be charged by a power controller of a motorcycle, the charge status module 209 may be configured to interact with a radio system or dashboard controller of the motorcycle for rending alerts in response to a determined improper or failed power connection.

In one embodiment, the instruction execution module 211 may submit instructions for actions to be performed by a user and/or a power controller in response to the detection of sensor information per the sensor status determination module 205. By way of example, an instruction may be rendered to activate or deactivate a sensor, to balance an available power of the sensor and other sensors of the wearable smart device, etc. The instruction may be transmitted by way of a communication interface 215. In addition, the instructions may be presented as messages for display to a user in the case where actions are to be performed by the user for affecting power use by way of a user interface module 213.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The above presented modules and components of the wearable platform 103 can be implemented in hardware, firmware, software, or a combination thereof. Though depicted as a separate entity in FIG. 1, it is contemplated that the wearable platform 103 may be implemented for direct operation by respective user devices 101. As such, the wearable platform 103 may generate direct signal inputs by way of the operating system of the user device 101 for interacting with the application 102. In another embodiment, one or more of the modules 201-215 may be implemented for operation by respective user devices 101, as a platform 103, or combination thereof.

Figure 6:
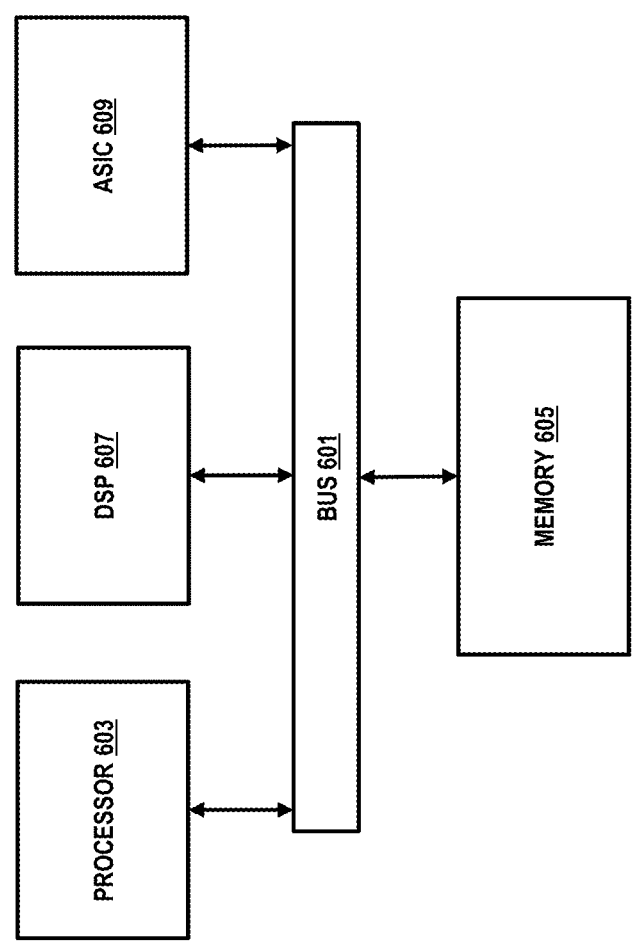
FIG. 6 is a diagram of a chip set that can be used to implement an embodiment of the invention.

FIGS. 3A-3D are flowcharts of a process for managing the use and distribution of power for wearable smart devices, according to various embodiments. In one embodiment, the wearable platform 103 performs the processes 300, 308, 318 and 326 and are implemented in, for instance, a chip set including a processor and a memory as shown in FIG. 6.

In step 301, the wearable platform 103 receives a notification signal for specifying sensor information associated with a sensor of a wearable smart device of a user. The signal may be submitted by way of any known range based communication protocols, i.e., Bluetooth or NFC. In another step 303, the platform 103 determines a power requirement of the sensor based on the sensor information, contextual information associated with a mobile device of the user, or a combination thereof based on receipt of the signal. The contextual information may include timing information, user or device identifier information or location information.

Per step 305, the platform 103 generates a request to regulate a consumption of power by the sensor or other sensors of the wearable smart device. The request may also be to access a power controller for charging the sensor, or a combination thereof based on the determination, status information associated with the power controller, or a combination thereof. Still further, in step 307, the platform 103 transmits the request to the sensor or other sensors, the power controller, or a combination thereof. As noted previously, the regulating includes (a) activating or deactivating the sensor or the other sensors, (b) balancing an available power of the wearable smart device between the sensor and the other sensors, (c) balancing an available power of the power controller, a power source, or a combination thereof between the sensor and the other sensors, or (d) a combination thereof and the request is an instruction to be performed by the sensor or other sensors, the power controller, the user device, the user, or a combination thereof.

In step 309 of process 308 (FIG. 3B), the platform 103 determines an amount of power discharge associated with the sensor, a power capacity associated with the sensor, an expected charge duration, or a combination thereof based on the sensor information. As noted previously, the power requirement is based on the determination and the request to access the power controller specifies the power requirement. In another step 311, the platform 103 determines a trust level of the power controller based on historic use information associated with the user, identifier information associated with the power controller, the status information, or a combination thereof. As mentioned, the trust level specifies a familiarity of the user with the power controller, a likelihood of availability of the power controller, or a combination thereof.

Per step 313, the platform 103 determines availability information, charge capability information, service provider information, payment information, or a combination thereof associated with the power controller based on the request. The status information is based on the determination, the trust level, or a combination thereof. In another step 315, the platform 103 generates a message for specifying a location of the power controller, other power controllers, or a combination thereof within a proximity of a location of the user device based on a matching of the status information, the context information, or a combination thereof. In another step 317, the platform 103 initiates a presenting of (a) the message to the user device, (b) directions for locating the power controller, the other power controllers, or a combination thereof, or (c) a combination thereof.

In step 319 of process 318 (FIG. 3C), the platform 103 receives a digital signature, label information, or a combination thereof from the sensor based on a random pulse signal, the label information, or a combination thereof as sent by the power controller to the sensor in response to the request. In steps 321 and 323 respectively, the platform transmits the digital signature, the label information, or a combination thereof to the power controller and initiates a payment for use of the power controller by the user based on a prepayment arrangement, a digital currency amount, or a combination thereof. As noted, the request to access the power controller is granted based on acknowledgement of (a) receipt of the digital signature, the label information, or a combination thereof by the power controller, (b) the payment by the user, or (c) a combination thereof.

In step 325, the platform 103 receives charge capability information associated with the power controller based on the acknowledgement. As noted, the charge capability information may include (a) a code for depicting a location of charge contact points of the wearable smart device, (b) an image for depicting a map of the charge contact points, or (c) a combination thereof. This information is useful for enabling a user device to distinguish between power controllers and their respective compatibility of use with a wearable smart device.

In step 327 of process 326 (FIG. 3D), the platform 103 generates a message for specifying a charge status, an operational status, a usage status, or a combination thereof of the sensor or the other sensors based on a granting of the request for access to the power controller and a connecting of the wearable smart device to the power controller. In step 329, the platform 103 generates a report based on analysis of the charge status the operational status, the usage status, or a combination thereof as collected over a period of time. By way of example, the period of time may be configured by the user for controlling the reporting frequency. In another step 331, the platform 103 initiates (a) a presenting of the message, a visual alert, an audio alert, or a combination thereof, (b) a presenting of the report, or (c) a combination thereof to the user device. As noted, the visual alert, the audio alert, or a combination thereof indicate a status of the connection between the wearable smart device and the power controller.

FIGS. 4A-4H are diagrams of user interfaces utilized in the processes of FIGS. 3A-3D, according to various embodiments. For the purpose of illustration, the diagrams are described with respect to an exemplary use case of a user of a device 401 that is configured with a wearable smart application for interacting with the wearable platform 103. Per these examples, the interaction of the user with the wearable platform 103 and various power controllers and wearable smart device types is described. It is noted, however, that the wearable platform 103 may be configured to accommodate other environments and usage scenarios.

Figure 4A:
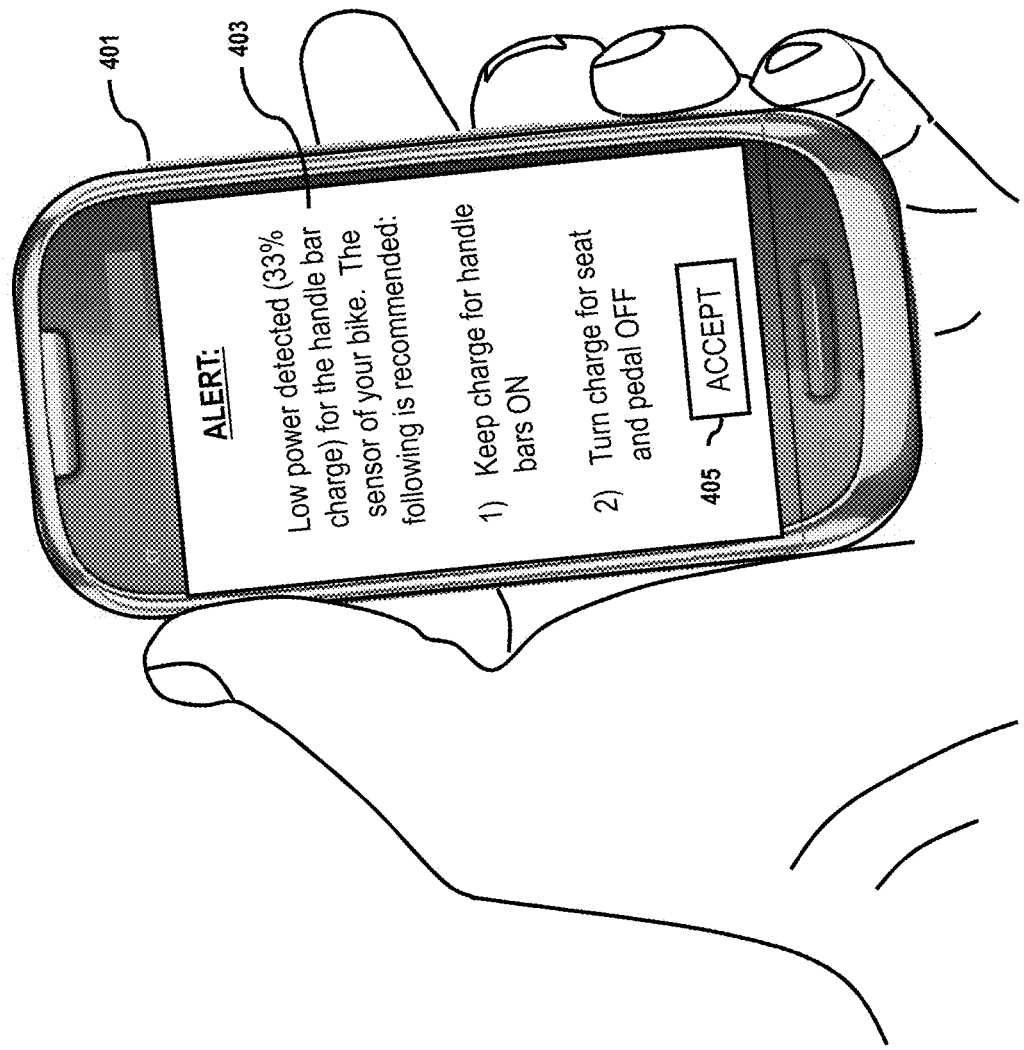
FIGS. 4A-4H are diagrams of user interfaces utilized in the processes of FIGS. 3A-3D, according to various embodiments.
Figure 4B:
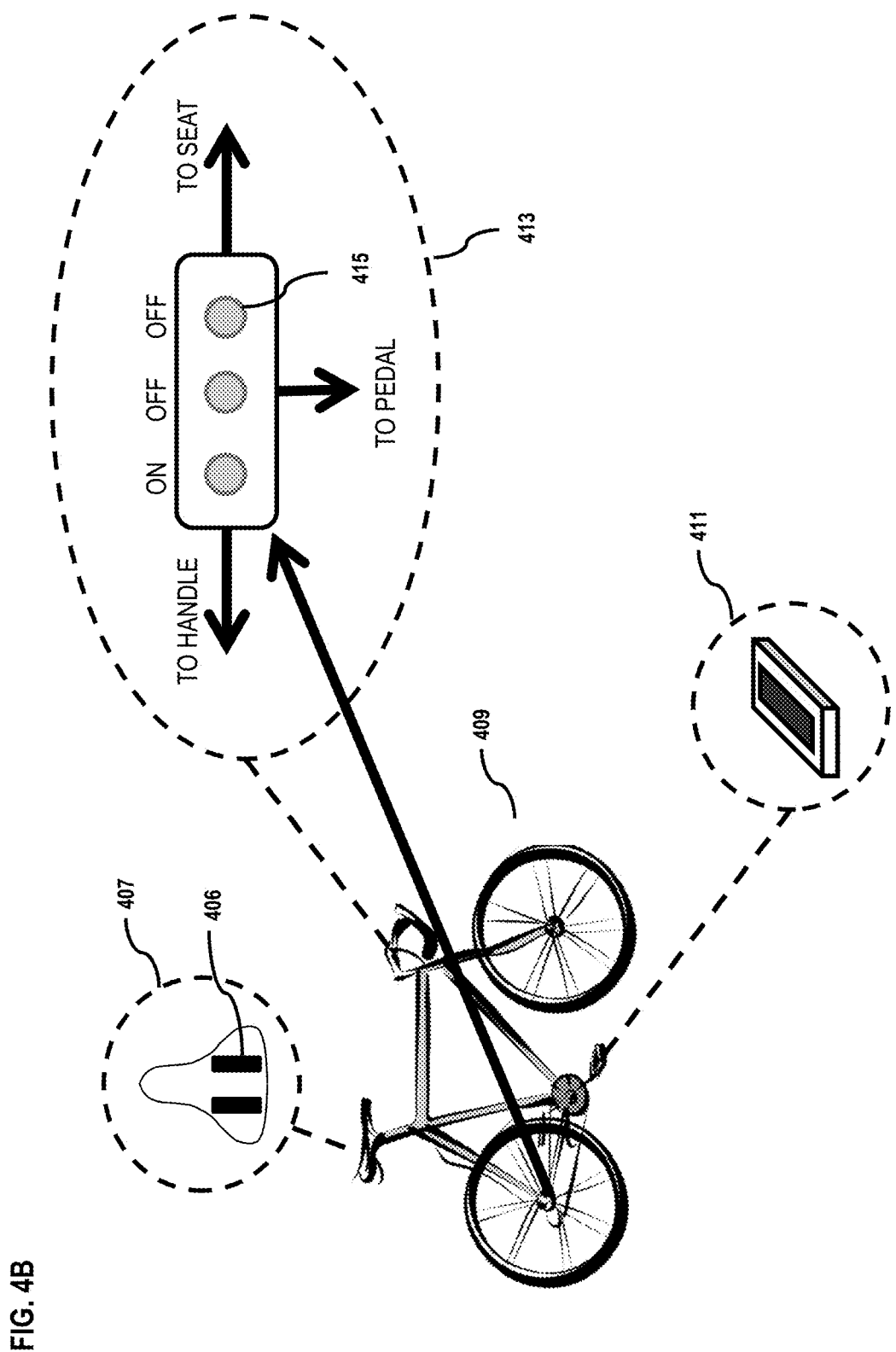

In FIGS. 4A and 4B, the user is a cyclist. As such, the user employs a bike 409 that has sensors embedded in various components of the bike for sensing usage and/or environmental phenomenon. In this example, the sensors are embedded within the handlebars, the seat and the pedals, and are controlled by a sensor controller. Similarly, charge contacts (e.g., 406) are embedded in the seat 407 and pedals 411 for enabling the charging/connecting of wearable smart items of the user during riding, i.e., a wearable smart shoe for tracking speed and distance and wearable smart pants for tracking bike usage data.

In addition, the bike features a kinetic power generation system (not shown), which converts the power generated from pedaling of the user into useful power for charging the sensors, powering the bike, etc. The kinetic power generation system includes a battery unit for storing the power generated and this power is further used to charge the internal sensors of the bicycle 409 as well as provide power during a connection of the wearable smart shoe or pants with the charge contacts 406. Still further, the kinetic power generation system features a dynamometer that measures the amount of power generated as a result of the kinetic activity of the user. This information is provided as feedback to a mechanical-electrical power controller that is configured to interact with the battery (the source). In this case, the power controller features buttons (e.g., 415) that may be activated or deactivated at the discretion of the user for turning power ON or OFF for a given charge contact point of a component of the bicycle 409. For example, a button may be associated with a contact for the handle, the pedal 411 and the seat 407 accordingly.

In FIG. 4A, the user stops to check the sensor readings collected so far regarding their journey by way of a biking application/service of their mobile phone 401 that relies of the sensor readings, i.e., total miles driven, revolutions/second, number of braking occurrences, etc. While checking the application, the user receives a notification message from the wearable platform 103 regarding the current power settings of the various sensors, including the sensors for the seat 406 and pedals 411. In this case, the message 403 generated by the platform 103 indicates that the handle bar sensor (not shown) is in a low power state. Recognizing the power controller 413 as a trusted power source of the user, the message also specifies one or more requested actions the user is to execute with respect to the controller. This includes, for example, keeping the power to the handle bars on but turning the power to the seat 407 and pedals 411 off for the duration of the journey. This request may be based on known parameters regarding the journey, such as final destination data, expected ride duration, etc. In addition, the request may be presented as an instruction for maximizing the user's ability to conserve power for the critical items.

Still further, while not shown, the wearable smart application may present a request for the user to deactivate one of the wearable smart devices they are wearing. In this case, when it is determined per the sensor information of the bicycle that it is not generating enough power, these wearable smart devices may be turned off in order to save the battery power or until additional kinetic charge is generated.

Figure 4C:
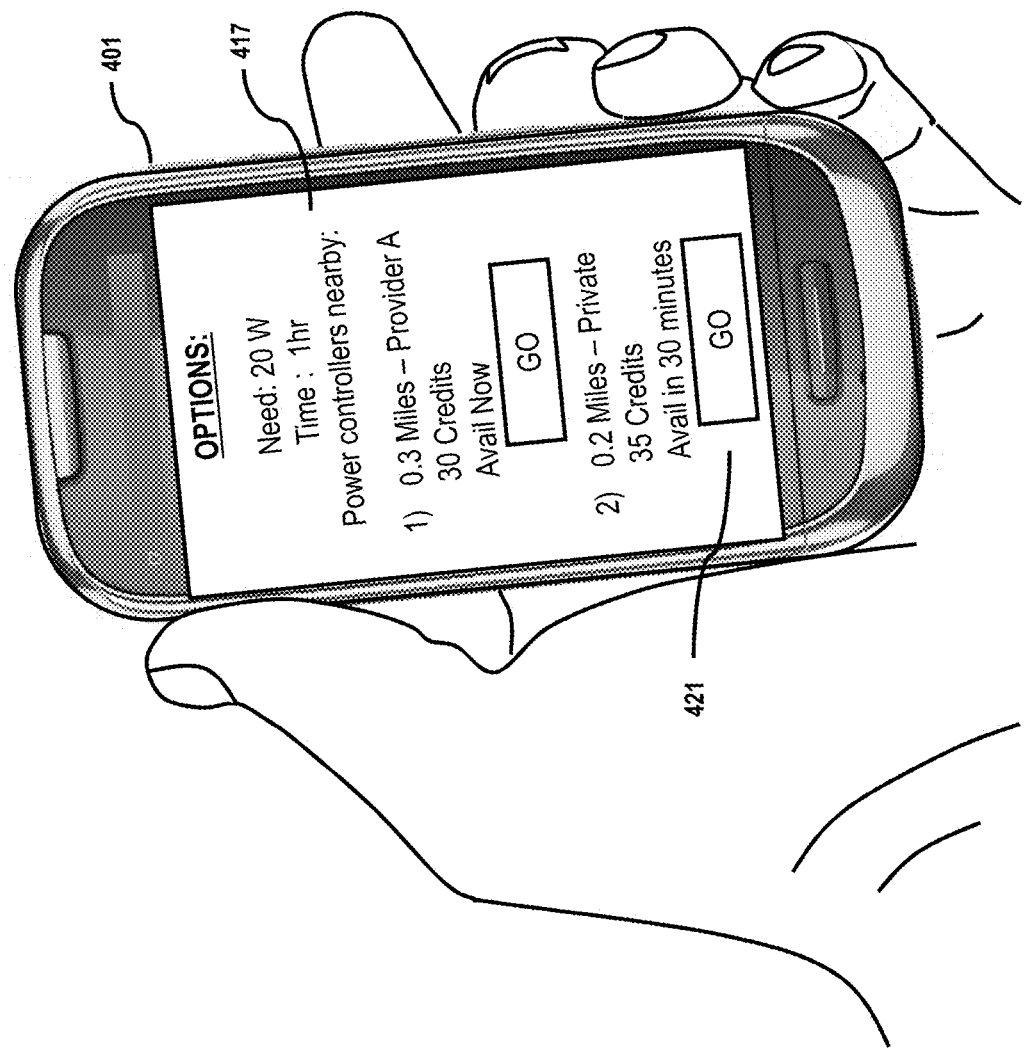

In FIG. 4C, an operation of the wearable platform 103 for operation with the user in an untrusted environment is presented. In this case, it is assumed the user does not have a mechanical-electrical power controller 413, and must therefore charge up at a nearby power controller. Based on the determined power need and expected charge duration, the platform 103 identifies one or more power controllers within proximity of the user. The platform 103 then presents this as an option message 417 to the user device. The option message 417 includes a relative distance of the power controllers from the current location of the user, payment and availability information. In addition, the service provider of the power controllers is presented. Hence, while many different power controllers may be within range of the user, the platform 103 presents those that are most relevant to the user based on service provider requirements, payment options, contextual conditions, accessibility and the like. The user may select a GO action button (e.g., 421) in order to initiation a navigation session for heading to the location of their choice.

Figure 4D:
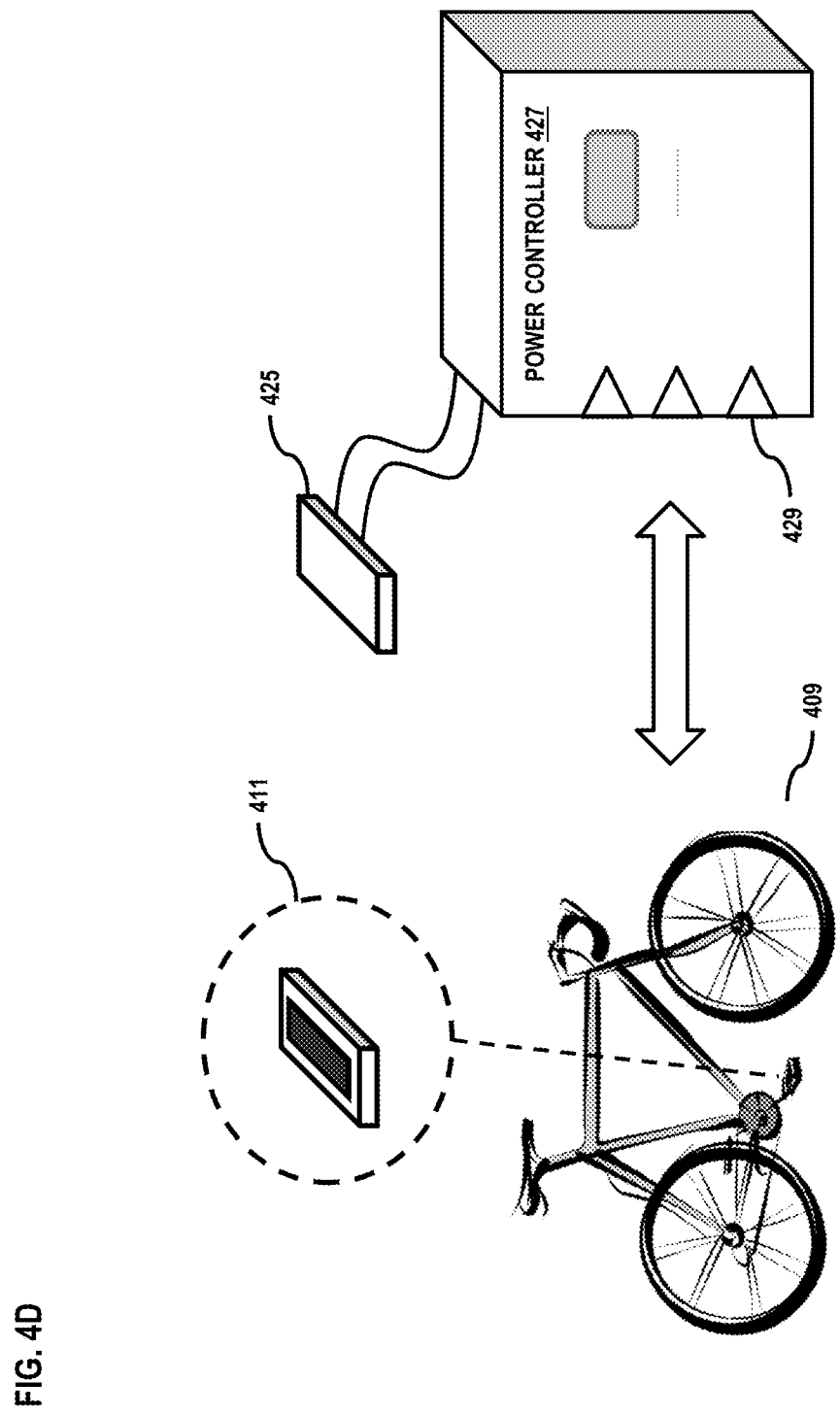
Figure 4F:
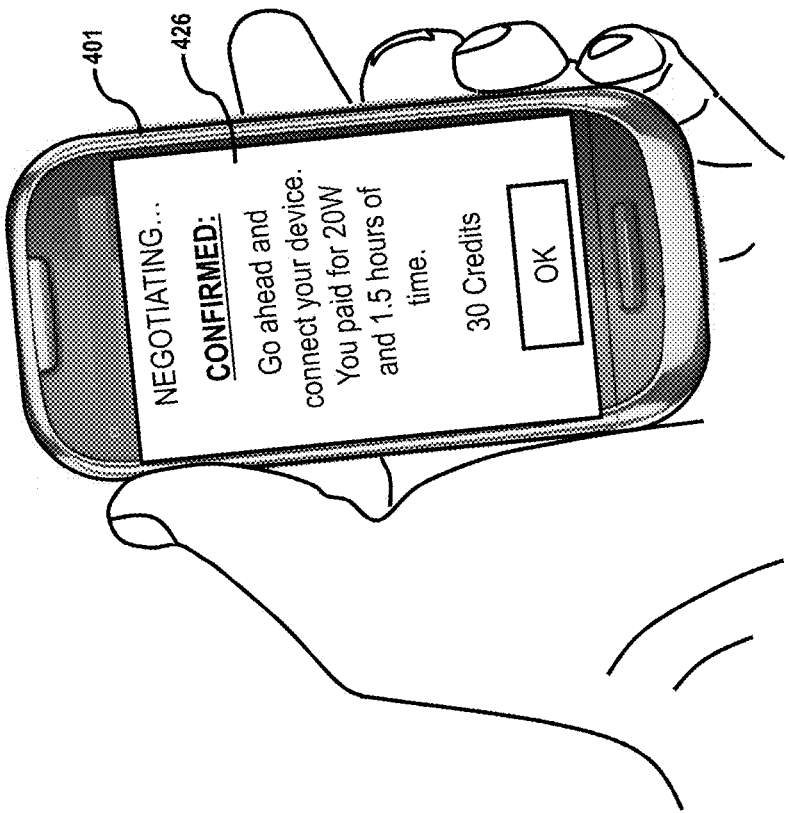
Figure 4E:
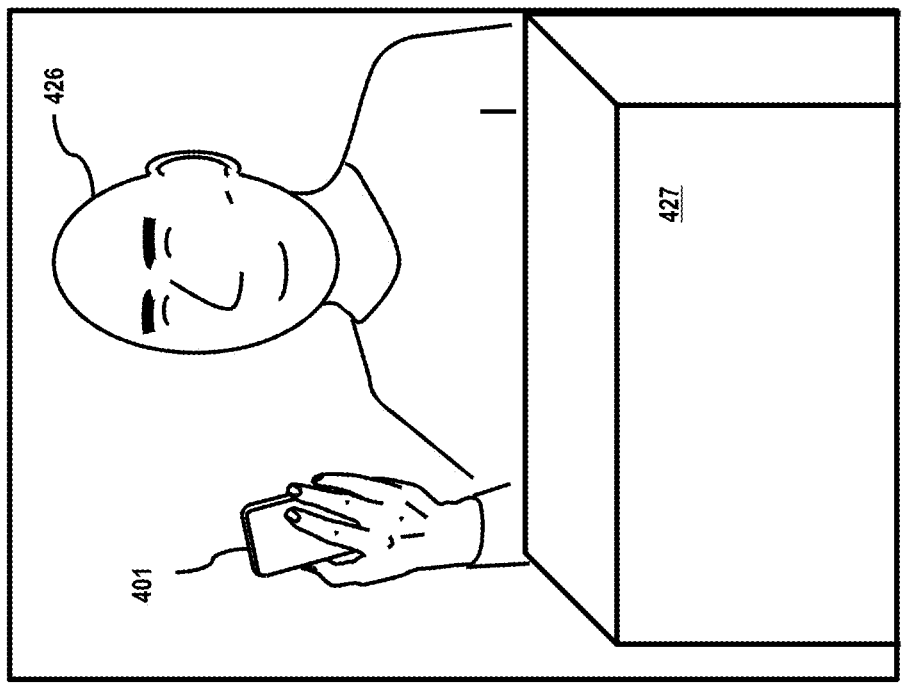

In FIGS. 4D and 4E, the user 426 approaches one of the identified power controllers 427. In this case, the negotiation process is performed between the platform 103 and the power controller 427 in order to permit the user to access the power controller and begin charging the sensors (of the bike or other wearable smart devices). As shown in FIG. 4D, the power controller includes multiple connector types for charging wearables, including a connector 425 featuring contacts for connecting to the pedal 411 of the bicycle 409. Alternatively, other charge contact types (e.g., 429) may also be presented for use by the power controller 427.

In FIGS. 4E and 4F, the user gets off the bike and approaches the power controller 427. Alternatively, the user may stay on the bicycle. As the negotiation and authentication process is performed between the platform 103 and the controller 427—i.e., the exchange of charge capability information, digital code information, digital power signature information, status information regarding the power controller—the user's mobile device 401 presents a status message 426 regarding the transaction. The status message indicates that the negotiation/authentication process is currently underway. Upon completion, a confirmation is also presented for indicating the transaction details. In this case, the confirmation message also indicates instructions for the user to connect the charge connector 425 of the power controller to the pedal 411 accordingly.

It is noted that the negotiation procedure is performed seamlessly, with minimal to no user interaction required during the process for ease of use. Also of note, in the case where the user selects a power controller of a provider they are under contract with for their power needs (e.g., Service Provider A) in advance, the authentication process may be further streamlined. For example, as the bicycle approaches to within range of the platform 103, identification information may be exchanged for determining the familiar (trusted) relationship. As a result, validation of the wearable smart application 102 (e.g., per the digital signature) is not required nor is validation of the familiarity of the user with the controller. Under this scenario, the user is able to automatically be identified by the power controller 427 for enabling authentication and access to the controller 427 as they ride up to the controller (assuming there are no availability conflicts).

Figure 4G:
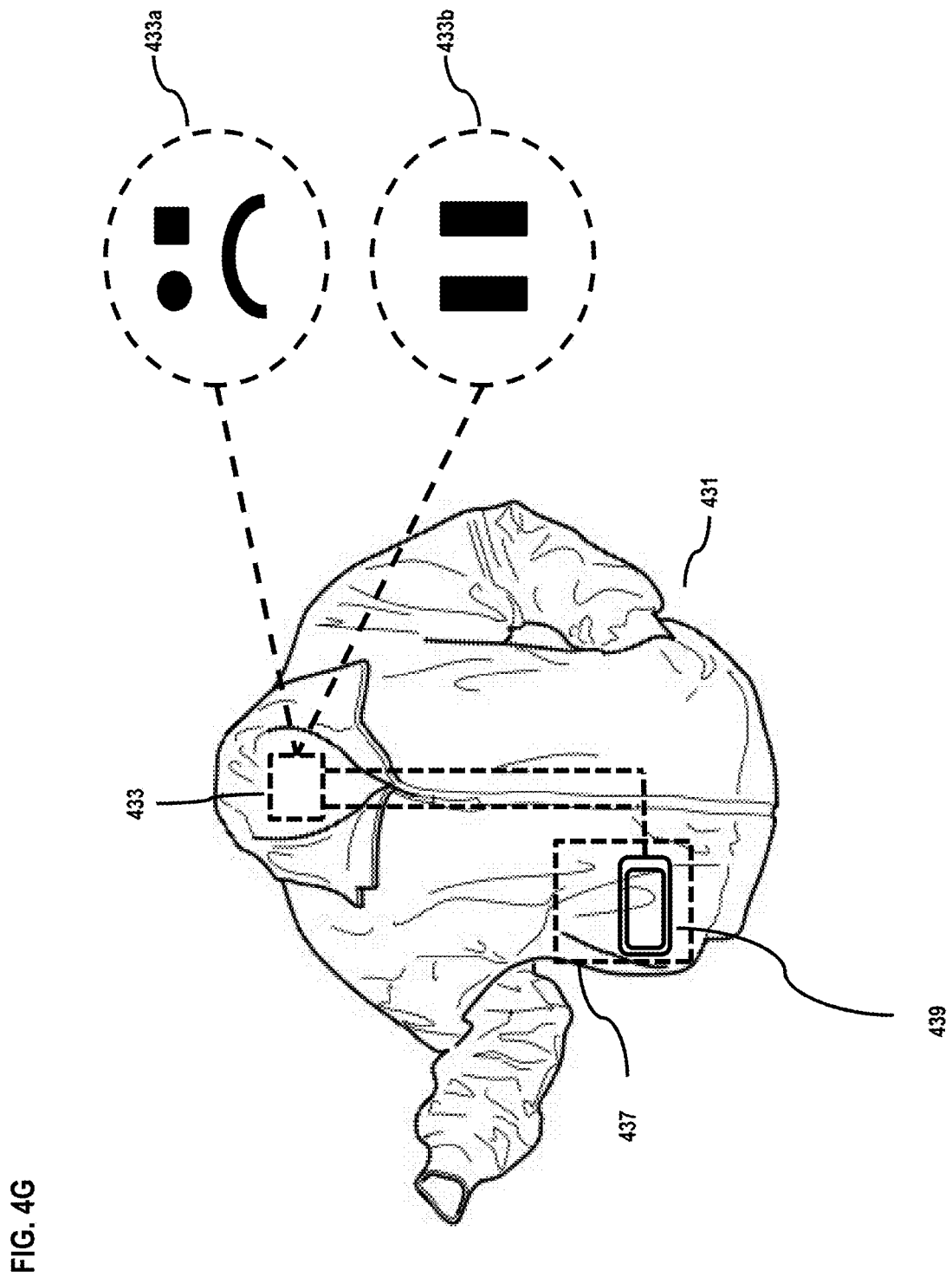
Figure 4H:
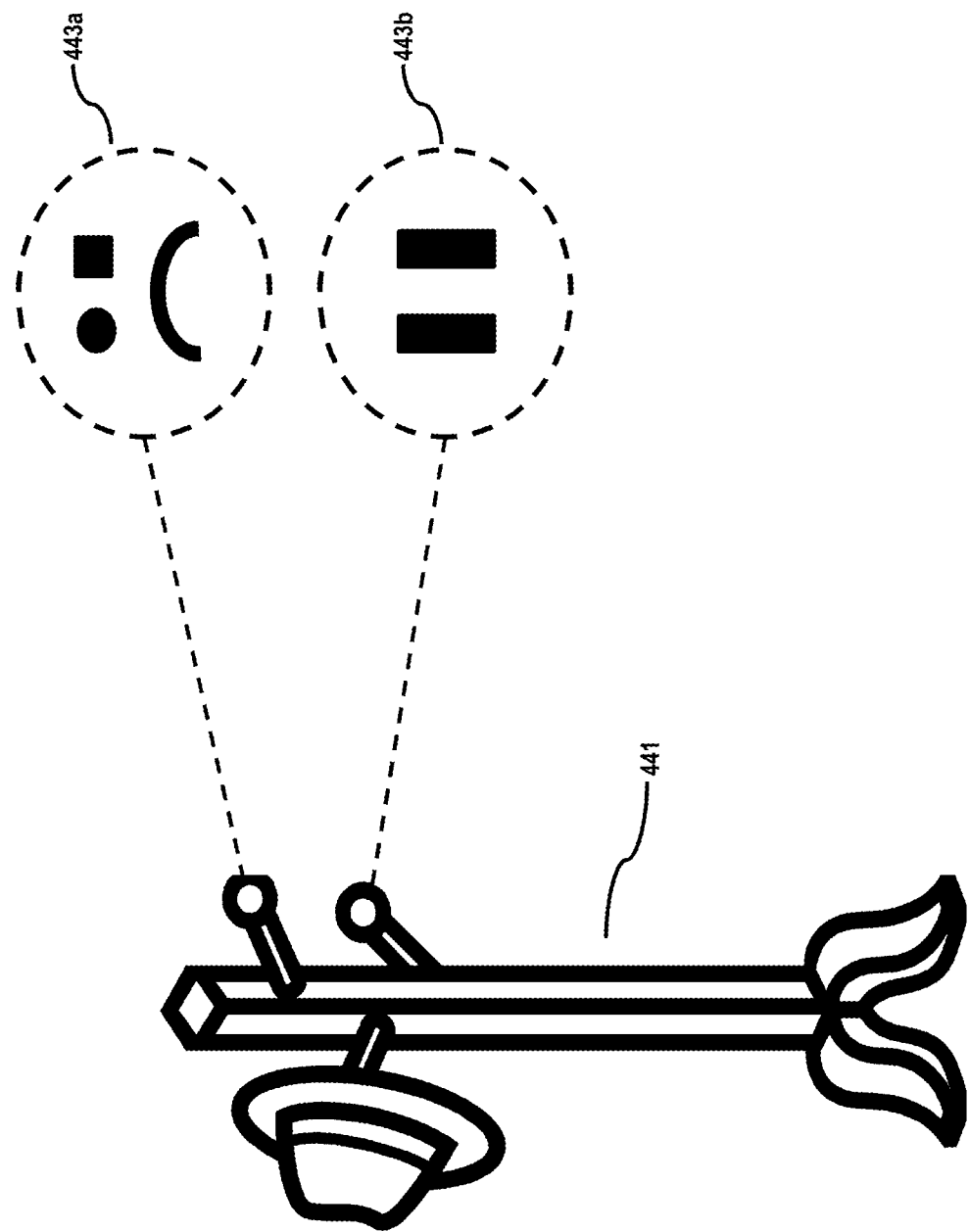

In FIGS. 4G and 4H, the user employs a wearable smart jacket 431, which features various sensors for detecting temperature and other phenomenon. In addition, the jacket 431 features a built-in power adapter in one of the jacket pockets 437 for permitting it to charge a smartphone 439 at the same time the jacket 431 is being powered up. Power is supplied to the jacket 431 by way of internal contacts 433 for permitting it to be connected to a compatible power controller. In this case, a first contact type 433*a* is shown. Alternatively, a second contact type 433*b* may be required.

Per this example, the connector types correspond to a power controller in the form of a coat hook 441. While not shown, the coat hook 441 contains other electronics components such as conductive stripes or mesh, internal batteries, a power controller, sensors and a sensor controller. In addition, the coat hook may be further connected to a power source, with intelligence for enabling it to regulate the charging of wearable smart jackets connected thereto. Also, the coat hook 441 features complimentary terminals 443*a* or 443*b* for connecting with connectors 433*a* or 433*b* respectively of the jacket 431. In the simplest case, there will be no power controller other than a mechanical switch to power the coat hook 441 ON or OFF, corresponding to a mechanical-electrical configuration. However, in the case where the coat hook is enhanced with a network interface, lighting capabilities or even a display, the coat hook 441 may be employed as an intelligent controller for enabling negotiated use. This may prove useful in a restaurant environment or meeting environment, where the access to power for charging the jacket is a commodity while patrons enjoy dinner or participate in a meeting.

The processes described herein for managing the use and distribution of power for wearable smart devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
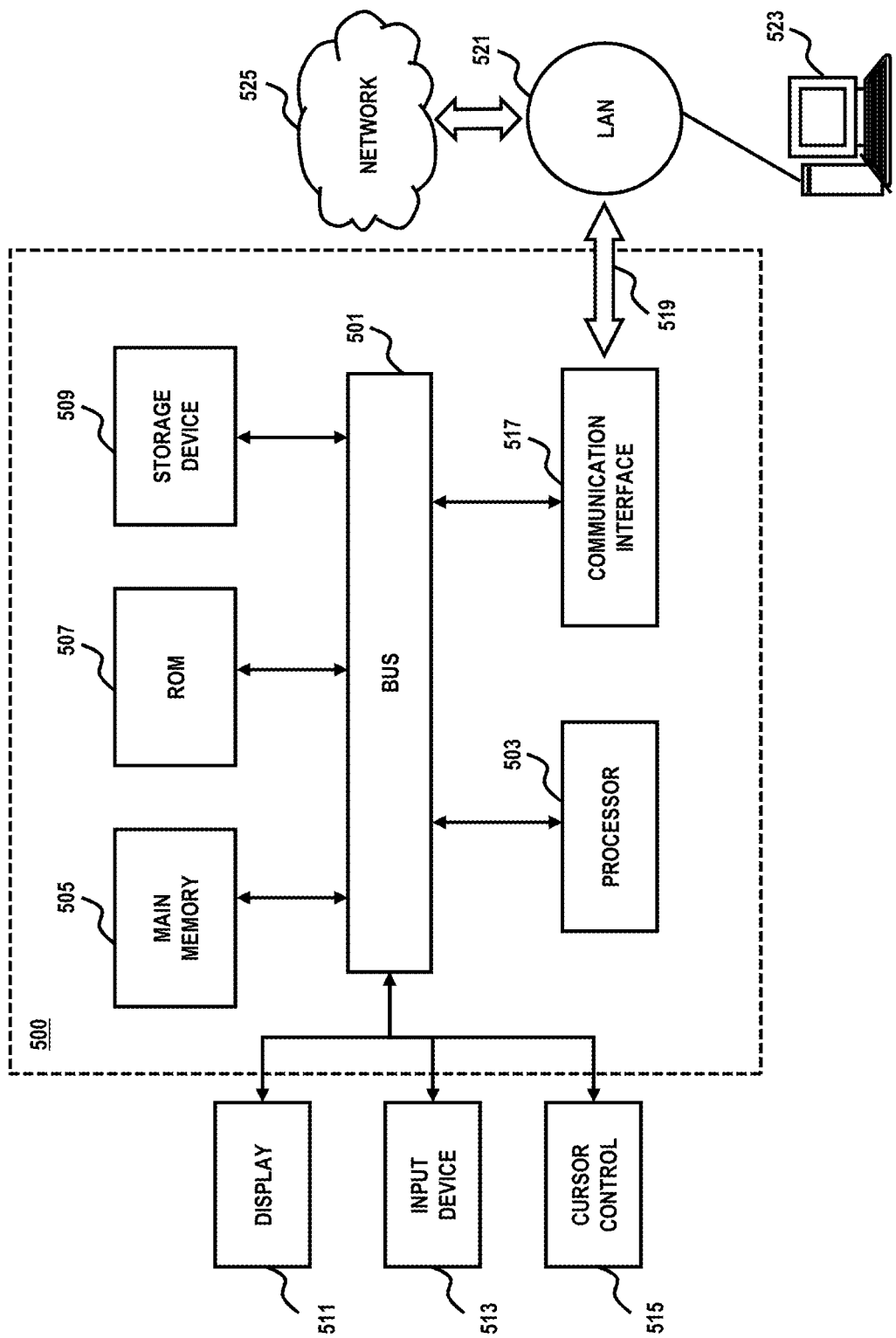
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A, 4C and 4F, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to manage the use and distribution of power for wearable smart devices as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of managing the use and distribution of power for wearable smart devices.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to manage the use and distribution of power for wearable smart devices. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

The invention claimed is:

1. A method comprising:
   receiving, by a network device and from a wearable smart device that includes wearable sensors that are powered from at least one sensor battery that is separate from a battery used to power the wearable smart device, a request to charge the at least one sensor battery, the request including power requirements of the wearable sensors;
   receiving, by the network device, information indicating geographic locations of a plurality of recharging stations that are each located at different geographic locations;
   receiving, by the network device, information indicating charging capabilities of the plurality of recharging stations;
   identifying, by the network device, a geographic region in which the wearable smart device is located;
   comparing, by the network device, the geographic locations, of the plurality of recharging stations, to the geographic region in which the wearable smart device is located;
   identifying, by the network device and based on the comparing, which recharging stations, of the plurality of recharging stations, are located within the geographic region in which the wearable smart device is located, wherein the identified recharging stations are a set of recharging stations;
   selecting, by the network device, a particular recharging station, from the set of recharging stations that were identified as being located within the geographic region, that is to be used to charge the at least one sensor battery, wherein selecting the particular recharging station includes:
      comparing the charging capabilities, of the identified set of recharging stations, to the power requirements of the wearable sensors, and
      determining, based on the comparison of the charging capabilities to the power requirements, that the selected particular recharging station is compatible with the received power requirements of the wearable sensors;
   generating, by the network device, first instructions that include navigation instructions from a current location of the wearable device to a geographical location of the particular recharging station;
   generating, by the network device, second instructions, for the wearable sensors, that instruct the wearable sensors to deactivate the wearable sensors until the at least one sensor battery is charged; and
   communicating, by the network device, the first and second instructions to the wearable smart device.

2. The method of claim 1, further comprising:
   determining an amount of power discharge associated with the wearable sensors and a power capacity associated with the wearable sensors; and
   determining an expected charge duration based on the amount of power discharge and the power capacity associated with the wearable sensors,
   wherein the selection of the particular recharging station is based on determining that the particular recharging station is capable of providing charging services for at least the expected charge duration.

3. The method of claim 1, further comprising:
   determining a trust level of the particular recharging station based on historic use information associated with the user, identifier information associated with the recharging station, or status information associated with the recharging station.

4. The method of claim 3, wherein the status information is based on at least one of the trust level, availability information, charge capability information, service provider information, or payment information, associated with the recharging station.

5. The method of claim 1, further comprising:
   generating a message that indicates a location of one or more other recharging stations, of the set of recharging stations, within a proximity of a location of the wearable smart device based on a matching of status information associated with the one or more other recharging stations; and
   initiating a presenting of the message to the user of the wearable smart device.

6. The method of claim 1, further comprising:
   determining a digital signature from the wearable sensors based on a random pulse signal received from the wearable smart device;
   transmitting the digital signature to the particular recharging station; and
   initiating a payment for use of the particular recharging station, using the digital signature, based on a prepayment arrangement,
      wherein a request to access the recharging station is granted based on acknowledgement of receipt of the digital signature by the particular recharging station.

7. The method of claim 1, further comprising:
determining a type of charging interface associated with the wearable smart device,
wherein selecting the particular recharging station further includes determining that the particular recharging station includes a same type of charging interface as the type of charging interface associated with the wearable smart device, wherein the particular type of charging interface includes a particular arrangement of charge contact points.

8. The method of claim 1, further comprising:
generating a message for specifying a charge status, of the at least one sensor battery of the wearable smart device, to the particular recharging station;
generating a report based on an analysis of the charge status, as collected over a period of time; and
initiating a presenting of the report, to the wearable smart device,
wherein the report indicates a status of a connection between the wearable smart device and the particular recharging station.

9. An apparatus comprising a processor configured to:
receive, from with a wearable smart device that includes wearable sensors that are powered from at least one sensor battery that is separate from a battery used to power the wearable smart device, a request to charge the at least one sensor battery, the request including power requirements of the wearable sensors;
receive information indicating geographic locations of a plurality of recharging stations that are each located at different geographic locations;
receive information indicating charging capabilities of the plurality of recharging stations;
identify a geographic region in which the wearable smart device is located;
compare the geographic locations, of the plurality of recharging stations, to the geographic region in which the wearable smart device is located;
identify, based on the comparing, which recharging stations, of the plurality of recharging stations, are located within the geographic region in which the wearable smart device is located, wherein the identified recharging stations are a set of recharging stations;
select a particular recharging station, from the set of recharging stations that were identified as being located within the geographic region, that is to be used to charge the at least one sensor battery, wherein selecting the particular recharging station includes:
comparing the charging capabilities, of the identified set of recharging stations, to the power requirements of the wearable sensors, and
determining, based on the comparison of the charging capabilities to the power requirements, that the selected particular recharging station is compatible with the received power requirements of the wearable sensors;
generate first instructions that include navigation instructions from a current location of the wearable device to a geographical location of the particular recharging station;
generate second instructions, for the wearable sensors, that instruct the wearable sensors to deactivate the wearable sensors until the at least one sensor battery is charged; and
communicate the first and second instructions to the wearable smart device.

10. The apparatus of claim 9, wherein the processor is further configured to:
determine an amount of power discharge associated with the wearable sensors and a power capacity associated with the wearable sensors; and
determine an expected charge duration based on the amount of power discharge and the power capacity associated with the wearable sensors,
wherein the selection of the particular recharging station is based on determining that the particular recharging station is capable of providing charging services for at least the expected charge duration.

11. The apparatus of claim 9, wherein the processor is further configured to:
determine a trust level of the particular recharging station based on historic use information associated with the user, identifier information associated with the recharging station, or status information associated with the recharging station.

12. The apparatus of claim 11, wherein the status information is based on at least one of the trust level, availability information, charge capability information, service provider information, or payment information, associated with the recharging station.

13. The apparatus of claim 9, wherein the processor is further configured to:
generate a message that indicates a location of one or more other recharging stations, of the set of recharging stations, within a proximity of a location of the wearable smart device based on a matching of status information associated with the one or more other recharging stations; and
initiate a presenting of the message to the user of the wearable smart device.

14. The apparatus of claim 9, wherein the processor is further configured to:
determine a digital signature from the wearable sensors based on a random pulse signal received from the wearable smart device;
transmit the digital signature to the particular recharging station; and
initiate a payment for use of the particular recharging station, using the digital signature, based on a prepayment arrangement,
wherein a request to access the recharging station is granted based on acknowledgement of receipt of the digital signature by the particular recharging station.

15. The apparatus of claim 9, wherein the processor is further configured to:
determine a type of charging interface associated with the wearable smart device,
wherein selecting the particular recharging station further includes determining that the particular recharging station includes a same type of charging interface as the type of charging interface associated with the wearable smart device, wherein the particular type of charging interface includes a particular arrangement of charge contact points.

16. A system comprising:
a wearable smart device including wearable sensors that are powered from at least one sensor battery that is separate from a battery used to power the wearable smart device;
a plurality of recharging stations configured to operate as a battery recharging stations for wearable smart devices of a wireless telecommunications network, wherein at least a set of recharging stations, of the plurality of recharging stations, are located within a particular geographic region; and a network device configured to:
- receive information indicating geographic locations of the plurality of recharging stations;
- receive information indicating charging capabilities of the plurality of recharging stations;
- receive, from the wearable smart device, a request to charge at least one sensor battery at a recharging station of the plurality of recharging stations, the request including power requirements of the wearable sensors;
- identify that the wearable smart device is located within the particular geographic region;
- compare the geographic locations, of the plurality of recharging stations, to the geographic region in which the wearable smart device is located;
- identify, based on the comparing, the set of recharging stations, of the plurality of recharging stations, that are located within the geographic region in which the wearable smart device is located;
- select a particular recharging station, from the set of recharging stations that have been identified as being located within the particular geographic region, that is to be used to charge the at least one sensor battery, wherein selecting the particular recharging station includes:
  - comparing the charging capabilities, of the identified set of recharging stations, to the power requirements of the wearable sensors, and
  - determining, based on the comparison of the charging capabilities to the power requirements, that the selected particular recharging station is compatible with the received power requirements of the wearable sensors;
- generate first instructions that include navigation instructions from a current location of the wearable device to a geographical location of the particular recharging station;
- generate second instructions, for the wearable sensors, that instruct the wearable sensors to deactivate the wearable sensors until the at least one sensor battery is charged; and
- communicate the first and second instructions to the wearable smart device.

17. The apparatus of claim 16, wherein the network device is further configured to:
- determine an amount of power discharge associated with the wearable sensors and a power capacity associated with the wearable sensors; and
- determine an expected charge duration based on the amount of power discharge and the power capacity associated with the wearable sensors,
- wherein the selection of the particular recharging station is based on determining that the particular recharging station is capable of providing charging services for at least the expected charge duration.

18. The apparatus of claim 16, wherein the network device is further configured to:
- generate a message that specifies a charge status, of the at least one sensor battery of the wearable smart device, to the particular recharging station;
- generate a report based on an analysis of the charge status, as collected over a period of time; and
- initiate a presenting of the report, to the wearable smart device,
  - wherein the report indicates a status of a connection between the wearable smart device and the particular recharging station.

19. The apparatus of claim 16, wherein the network device is further configured to:
- determine a trust level of the particular recharging station based on historic use information associated with the user, identifier information associated with the recharging station, or status information associated with the recharging station.

20. The apparatus of claim 16, wherein the network device is further configured to:
- determine a digital signature from the wearable sensors based on a random pulse signal received from the wearable smart device;
- transmit the digital signature to the particular recharging station; and
- initiate a payment for use of the particular recharging station, using the digital signature, based on a prepayment arrangement,
  - wherein a request to access the recharging station is granted based on acknowledgement of receipt of the digital signature by the particular recharging station.

* * * * *